US012762732B2

(12) United States Patent
Zhang

(10) Patent No.: US 12,762,732 B2
(45) Date of Patent: Oct. 13, 2026

(54) IMAGE PROCESSING METHOD AND ELECTRONIC DEVICE

(71) Applicant: Honor Device Co., Ltd., Shenzhen (CN)

(72) Inventor: Kaiwen Zhang, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 143 days.

(21) Appl. No.: 18/862,719

(22) PCT Filed: Aug. 18, 2023

(86) PCT No.: PCT/CN2023/113746
§ 371 (c)(1),
(2) Date: Nov. 4, 2024

(87) PCT Pub. No.: WO2024/051471
PCT Pub. Date: Mar. 14, 2024

(65) Prior Publication Data
US 2025/0285322 A1 Sep. 11, 2025

(30) Foreign Application Priority Data
Sep. 7, 2022 (CN) ......................... 202211105947.X

(51) Int. Cl.
*G06T 7/73* (2017.01)
*G06T 1/60* (2006.01)
(Continued)

(52) U.S. Cl.
CPC .................. *G06T 7/73* (2017.01); *G06T 1/60* (2013.01); *G06T 7/246* (2017.01); *G06T 17/20* (2013.01)

(58) Field of Classification Search
CPC .. G06T 7/73; G06T 1/60; G06T 7/246; G06T 17/20; G06T 1/20; G06T 7/207;
(Continued)

(56) References Cited

U.S. PATENT DOCUMENTS

2021/0014526 A1 1/2021 Chen et al.
2024/0276009 A1 8/2024 Lee et al.

FOREIGN PATENT DOCUMENTS

CN 110870306 A 3/2020
CN 111919439 A 11/2020
(Continued)

*Primary Examiner* — Tammy Paige Goddard
(74) *Attorney, Agent, or Firm* — Leydig, Voit & Mayer, Ltd.

(57) ABSTRACT

Embodiments of this application relate to the field of image processing, and disclose an image processing method and an electronic device, which can accurately and quickly calculate motion vectors of a static mesh and a dynamic mesh separately, thereby reducing computing power overheads for vector calculation, and improving prediction efficiency. A specific solution includes: determining a position of a static mesh of a next frame image based on intermediate rendering variables of at least two completed frame images, where each intermediate rendering variable includes an MVP matrix and depth data of a corresponding frame image; and determining, based on coordinate data of a first model in the at least two completed frame images, a position of the first model in the next frame image. A mesh corresponding to the first model is a dynamic mesh in the image.

20 Claims, 13 Drawing Sheets

(51) Int. Cl.
*G06T 7/246* (2017.01)
*G06T 17/20* (2006.01)

(58) Field of Classification Search
CPC ....... G06T 15/00; G06T 15/005; G06T 17/00; Y02D 10/00
See application file for complete search history.

(56) References Cited

FOREIGN PATENT DOCUMENTS

| | | | |
|---|---|---|---|
| CN | 113362442 | A | 9/2021 |
| CN | 113837920 | A | 12/2021 |
| CN | 114862997 | A | 8/2022 |
| KR | 1020160147408 | A | 12/2016 |

IMAGE PROCESSING METHOD AND ELECTRONIC DEVICE

CROSS-REFERENCE TO RELATED APPLICATIONS

This application is a national stage of International Application No. PCT/CN2023/113746, filed on Aug. 18, 2023, which claims priority to Chinese Patent Application No. 202211105947.X, filed on Sep. 7, 2022. The disclosures of both of the aforementioned applications are hereby incorporated by reference in their entireties.

TECHNICAL FIELD

Embodiments of this application relate to the field of image processing, and in particular, to an image processing method and an electronic device.

BACKGROUND

In a frame prediction technology, positions of objects in a next frame image can be predicted through relevant data of a rendered frame image. The technology is widely used in display solutions with a frame insertion demand.

In a current frame prediction technology, positions of a same object (model) in different frame images may be determined through color or brightness matching of each pixel point, and a motion vector of each pixel point may be calculated based on a position change. Based on continuity of image display, prediction of a future frame image can be achieved based on the motion vector.

The solution imposes a relatively high requirement on a computing power and power consumption during implementation.

SUMMARY

Embodiments of this application provide an image processing method and an electronic device, which can accurately and quickly calculate motion vectors of a static mesh and a dynamic mesh separately, thereby accurately predicting a future frame image. Through the separate calculation of the static mesh and the dynamic mesh, computing power overheads for vector calculation are reduced, and prediction efficiency is improved.

To achieve the above objective, the following technical solutions are used in embodiments of this application:

According to a first aspect, an image processing method is provided. The method is applicable to an electronic device. The method includes: obtaining, by the electronic device, at least two frame images through image rendering, where the at least two frame images each include a dynamic mesh and a static mesh, and in different frame images, a model corresponding to the dynamic mesh has different coordinates under a world coordinate system, and a model corresponding to the static mesh has same coordinate under the world coordinate system; determining a position of a static mesh of a next frame image based on intermediate rendering variables of the at least two completed frame images, where each intermediate rendering variable includes a model-view-projection MVP matrix and depth data of a corresponding frame image; and determining, based on coordinate data of a first model in the at least two completed frame images, a position of the first model in the next frame image. A mesh corresponding to the first model is the dynamic mesh in the image. The coordinate data includes a normalized device coordinate NDC and a drawing parameter of the first model in the corresponding frame image. The NDC coordinate includes at least one vertex coordinate. The drawing parameter is used for instructing an electronic device to draw the first model. The electronic device may determine the next frame image based on the position of the static mesh of the next frame image and the position of the first model in the next frame image. It may be understood that, when the image includes other dynamic meshes in addition to the first model, the electronic device may determine, based on coordinate data of a corresponding model, a position of the motion model in the next frame image by using a processing mechanism similar to that used for the first model. The electronic device may obtain the next frame image in comprehensive combination with positions of different dynamic objects in the next frame image and positions of static objects in the next frame image, to achieve prediction of a future frame image.

In this way, the electronic device may determine a motion vector of the static mesh through the MVP matrix and the depth data. The MVP matrix and the depth data may be directly obtained through an instruction stream delivered by an application, thereby avoiding large data calculation overheads for determination of the static mesh. In addition, the electronic device may further determine a motion vector of each dynamic mesh through the coordinate data. For example, the electronic device may perform matching for the dynamic mesh based on the coordinate data, thereby avoiding computing power overheads for pixel-by-pixel brightness/color matching. Through the above solution, the calculation of the motion vectors of the static mesh and the dynamic mesh can be achieved. In addition, computing power overheads can be significantly reduced, and computing efficiency can be improved.

Optionally, the image includes models corresponding to a plurality of dynamic meshes. The determining, based on coordinate data of a first model in the at least two completed frame images, a position of the first model in the next frame image includes: determining coordinate data of the first model in different frame images based on the coordinate data of the first model in the at least two completed frame images and feature hash value matching, where the first model has a same feature hash value in different frame images, and different models have different feature hash values in a same frame image; and determining the position of the first model in the next frame image based on the coordinate data of the first model in the different frame images. In this way, in a complex image with a plurality of dynamic meshes, a coordinate correspondence of a same model in different frame images may be determined without a need of pixel-by-pixel matching, thereby significantly reducing corresponding computing power overheads and time overheads.

Optionally, the completed frame images include an $N^{th}$ frame image and an $(N-1)^{th}$ frame image, and the next frame image is an $(N+1)^{th}$ frame image. The determining a position of a static mesh of a next frame image based on intermediate rendering variables of the at least two completed frame images includes: determining a motion vector of a static mesh of the $N^{th}$ frame image based on a first MVP matrix and first depth data of the $(N-1)^{th}$ frame image and a second MVP matrix and second depth data of the $N^{th}$ frame image; and determining a position of the static mesh in the $(N+1)^{th}$ frame image based on a position of the static mesh in the $N^{th}$ frame image and the motion vector of the static mesh. In this way, in an example in which a current frame image is the $N^{th}$ frame image, the electronic device may obtain relevant data of the $N^{th}$ frame image after completing rendering of the current frame image, and predict the $(N+1)^{th}$ frame image in combination with data of the $(N-1)^{th}$ frame image. It should be understood that, in some other implementations, the completed frame images may be two discontinuous frame images, for example, may be an $N^{th}$ frame image and an $(N-2)^{th}$ frame image.

Optionally, a memory of the electronic device is configured with an intermediate rendering variable buffer. Before the determining a position of a static mesh of a next frame image based on intermediate rendering variables of the at least two completed frame images, the method further includes: obtaining the first MVP matrix, the first depth data, the second MVP matrix, and the second depth data, and storing the obtained data in the intermediate rendering variable buffer. The determining a position of a static mesh of a next frame image based on intermediate rendering variables of the at least two completed frame images includes: reading the first MVP matrix, the first depth data, the second MVP matrix, and the second depth data from the intermediate rendering variable buffer, and determining the position of the static mesh in the $(N+1)^{th}$ frame image.

Optionally, the application delivers a first instruction stream to instruct the electronic device to render the $(N-1)^{th}$ frame image. The intermediate rendering variable buffer includes a first intermediate rendering variable buffer. The obtaining and storing the first MVP matrix includes: intercepting, by the electronic device, a first instruction segment in the first instruction stream used for transmitting the first MVP matrix, and storing the first MVP matrix in the first intermediate rendering variable buffer based on the first instruction segment.

Optionally, the electronic device intercepts the first instruction segment of the first instruction stream based on a first preset identifier.

Optionally, the first preset identifier is a uniform parameter.

In the above solution, the electronic device may back up the first MVP matrix for subsequent use at a preset position in the memory, for example, in the intermediate rendering variable buffer during rendering of the $(N-1)^{th}$ frame image for subsequent calling.

Optionally, the application delivers the first instruction stream to instruct the electronic device to render the $(N-1)^{th}$ frame image. The intermediate rendering variable buffer includes a second intermediate rendering variable buffer. The obtaining and storing the first depth data includes: intercepting, by the electronic device, a second instruction segment in the first instruction stream related to the first depth data, and storing the first depth data in the second intermediate rendering variable buffer based on the second instruction segment.

Optionally, the second instruction segment related to the first depth data is used for instructing the electronic device to perform multiple render targets MRT.

In the above solution, the electronic device may back up the first depth data for subsequent use at a preset position in a memory, for example, in the intermediate rendering variable buffer during rendering of the $(N-1)^{th}$ frame image for subsequent calling.

Optionally, the application delivers a second instruction stream to instruct the electronic device to render the $N^{th}$ frame image. The intermediate rendering variable buffer includes a third intermediate rendering variable buffer. The obtaining and storing the second MVP matrix includes: intercepting, by the electronic device, a third instruction segment in the second instruction stream used for transmitting the second MVP matrix, and storing the second MVP matrix in the third intermediate rendering variable buffer based on the third instruction segment.

Optionally, the application delivers the second instruction stream to instruct the electronic device to render the $N^{th}$ frame image. The intermediate rendering variable buffer includes a fourth intermediate rendering variable buffer. The obtaining and storing the second depth data includes: intercepting, by the electronic device, a fourth instruction segment in the second instruction stream related to the second depth data, and storing the second depth data in the fourth intermediate rendering variable buffer based on the fourth instruction segment.

It should be understood that, the electronic device may back up the MVP matrix and the depth data during rendering of each frame image. For example, the electronic device may perform the above solution during the rendering of the $(N-1)^{th}$ frame image and during the rendering of the $N^{th}$ frame image, so that the MVP matrix and the depth data that are backed up can be smoothly called during subsequent prediction of a future frame image, thereby determining a position of a static mesh of the future frame image.

Optionally, the completed frame images include the $N^{th}$ frame image and the $(N-1)^{th}$ frame image, and the next frame image is the $(N+1)^{th}$ frame image. The determining, based on coordinate data of a first model in the at least two completed frame images, a position of the first model in the next frame image includes: determining a motion vector of the first model based on first coordinate data of the first model in the $(N-1)^{th}$ frame image and second coordinate data of the first model in the $N^{th}$ frame image; and determining the position of the first model in the $(N+1)^{th}$ frame image based on a position of the static mesh in the $N^{th}$ frame image and the motion vector of the first model. The solution provides an implementation of determining a motion vector of a dynamic mesh. It may be understood that, the frame image may include a plurality of dynamic meshes, which correspond to a plurality of dynamic objects. For each dynamic mesh, the electronic device may perform the solution, to determine a motion vector of each dynamic mesh. A description is provided below by using the first model as an example.

Optionally, the electronic device is configured with an NDC buffer. Before the determining a motion vector of the first model based on coordinate data of the first model, the method further includes: obtaining the first coordinate data and the second coordinate data of the first model, and storing the first coordinate data and the second coordinate data in the NDC buffer. The determining a motion vector of the first model based on coordinate data of the first model includes: reading the first coordinate data and the second coordinate data of the first model from the NDC buffer, and determining the motion vector of the first model based on the first coordinate data and the second coordinate data. During rendering of the dynamic mesh, the coordinate data is backed up in a preset NDC buffer for subsequent prediction of the future frame image.

Optionally, the application delivers the first instruction stream to instruct the electronic device to render the $(N-1)^{th}$ frame image. The NDC buffer includes a first NDC buffer. The obtaining the first coordinate data of the first model includes: enabling a transform feedback function before drawing of the first model in the $(N-1)^{th}$ frame image, where a GPU of the electronic device feeds back the first coordinate data to the electronic device based on the transform feedback function during the drawing of the first model, and the first coordinate data includes first NDC coordinate data of the first model in the $(N-1)^{th}$ frame image and a first drawing parameter corresponding to the first model in the $(N-1)^{th}$ frame image; and storing, by the electronic device, the first coordinate data in the first NDC buffer of the NDC buffer. This example provides a specific coordinate data obtaining solution. For example, through enabling of the transform feedback function, the GPU can feed back rendered coordinate data to the electronic device, so that the electronic device backs up the coordinate data.

Optionally, the method further includes: disabling the transform feedback function. It may be understood that, after storing coordinate data of a dynamic mesh corresponding to a Drawcall, the electronic device may disable the transform feedback function. In this way, if a next Drawcall corresponds to drawing of a static mesh, corresponding coordinate data does not need to be called back.

Optionally, the application delivers the second instruction stream to instruct the electronic device to render the $N^{th}$ frame image. The NDC buffer includes a second NDC buffer. The obtaining the second coordinate data of the first model includes: enabling the transform feedback function before the drawing of the first model in the $N^{th}$ frame image, where the GPU of the electronic device feeds back the second coordinate data to the electronic device based on the transform feedback function during the drawing of the first model, and the second coordinate data includes second NDC coordinate data of the first model in the $N^{th}$ frame image and a second drawing parameter corresponding to the first model in the $N^{th}$ frame image; and storing, by the electronic device, the second coordinate data in the second NDC buffer of the NDC buffer. The above solution is similar to the solution of obtaining the MVP matrix and the depth data. The electronic device may perform the solution for each Drawcall in each frame image during rendering of the frame image, so that coordinate data of all dynamic meshes in the frame image can be obtained and stored.

Optionally, before the obtaining the first coordinate data and the second coordinate data of the first model, the method further includes: determining that the mesh of the first model is the dynamic mesh.

Optionally, the determining that the mesh of the first model is the dynamic mesh includes: determining that the mesh of the first model is the dynamic mesh when coordinate data of the first model in a current frame image is updated.

In an example, when receiving a rendering instruction for a model, the electronic device may determine whether data in a frame buffer for storing coordinate data indicated in the rendering instruction is updated in the frame image. If the data is updated, it indicates that the corresponding model is a motion model and corresponds to a dynamic mesh. If the data is not updated, it indicates that the corresponding model is a static model and corresponds to a static mesh.

Optionally, the $N^{th}$ frame image includes at least two models whose meshes are dynamic meshes, the at least two models whose meshes are dynamic meshes include the first model, the NDC buffer stores coordinate data of each model corresponding to different frame images, and the method further includes: determining two pieces of coordinate data corresponding to the first model in the different frame images in the NDC buffer.

It may be understood that, a frame image may include a plurality of dynamic meshes. Different dynamic meshes may have different motion vectors. After the above backup of the data, two sets of coordinate data may be stored in the NDC buffer. For example, coordinate data of all dynamic meshes of the $(N-1)^{th}$ frame image in the first NDC buffer may be stored in the NDC buffer. For another example, coordinate data of all dynamic meshes of the $N^{th}$ frame image in the second NDC buffer may be stored in the NDC buffer. In this case, before calculating a motion vector of each model, coordinate data of the same model in different frame images needs to be determined by matching. The first model is still used as an example.

Optionally, the determining two pieces of coordinate data corresponding to the first model in the different frame images in the NDC buffer includes: determining, based on a drawing parameter included in each coordinate data stored in the NDC buffer, feature hash values corresponding to each coordinate data; and determining coordinate data in the NDC buffer that has a feature hash value the same as a feature hash value corresponding to the first coordinate data as the second coordinate data. This example provides a simple and convenient coordinate matching mechanism for a same model in different frame images. For example, for any coordinate data in the first NDC buffer and the second NDC buffer, a drawing parameter in the coordinate data may correspond to a unique feature hash value. In this way, coordinate data with the same feature hash value may be found from the first NDC buffer and the second NDC buffer as matching coordinate data for the same model in different frame images.

Optionally, the determining two pieces of coordinate data corresponding to the first model in the different frame images in the NDC buffer includes: determining, based on a drawing parameter included in each coordinate data stored in the NDC buffer, feature hash values corresponding to each coordinate data; and determining, as the second coordinate data, coordinate data in the NDC buffer which has a feature hash value the same as the feature hash value corresponding to the first coordinate data and which has a first vertex coordinate having a distance from a first vertex coordinate of the first coordinate data that is less than a preset distance. This example provides a more accurate and gradually changing coordinate matching mechanism. In this example, after the feature hash value matching, a degree of matching between the two pieces of coordinate data may be further verified based on a Euclidean distance between a plurality of vertex coordinates carried in the two pieces of coordinate data. It may be understood that, for a same model, a moving distance in an adjacent or nearby frame image is limited. Therefore, for a same vertex in the same model, a distance in a different frame image may be less than a preset distance. In this way, accuracy of the coordinate matching can be further improved, thereby improving accuracy of calculating the motion vector based on the coordinate data.

Optionally, the drawing parameter includes at least one of a vertex identifier ID, an index ID, a draw count, and a draw offset.

According to a second aspect, an electronic device is provided. The electronic device includes one or more processors and one or more memories. The one or more memories are coupled to the one or more processors. The one or more memories store computer instructions. The one or more processors, when executing the computer instructions, cause the electronic device to perform the method in the above first aspect and any one of the possible designs.

According to a third aspect, a chip system is provided. The chip system includes an interface circuit and a processor. The interface circuit and the processor are connected to each other through a line. The interface circuit is configured to receive a signal from a memory and send the signal to the processor. The signal includes computer instructions stored in the memory. When the processor executes the computer instructions, the chip system performs the method in the above first aspect and any one of the possible designs.

According to a fourth aspect, a computer-readable storage medium is provided. The computer-readable storage medium includes computer instructions. The computer instructions, when running, perform the method in the above first aspect and any one of the possible designs.

According to a fifth aspect, a computer program product is provided. The computer program product includes instructions. The computer program product, when running on a computer, causes the computer to perform the method in the above first aspect and any one of the possible designs.

It should be understood that, all technical features of the technical solutions provided in the above second aspect, third aspect, fourth aspect, and fifth aspect may correspond to the technical solutions provided in the first aspect and possible designs thereof, and the similar beneficial effects can be achieved. Details are not described herein.

DESCRIPTION OF EMBODIMENTS

Various types of applications may run in an electronic device, which are configured to provide rich functions for users. For example, an application in an electronic device may instruct a display of the electronic device to provide a display function for a user. The display function may include functions such as displaying a video stream and displaying an image stream.

An example in which the display function is displaying a video stream is used. The video stream may be composed of a plurality of frame images. The electronic device can quickly play the frame images in sequence, so that the user watches a dynamic picture composed of continuously played frame images through the display of the electronic device. A quantity of frame images played by the electronic device per unit time may be identified by a frame rate. A higher frame rate indicates more frame images played by the electronic device per unit time. Correspondingly, the dynamic picture is clearer and more realistic.

For each frame image, the application may instruct, through a rendering instruction stream, the electronic device to perform corresponding drawing, to obtain display information, and display the display information through the display.

Figure 1:
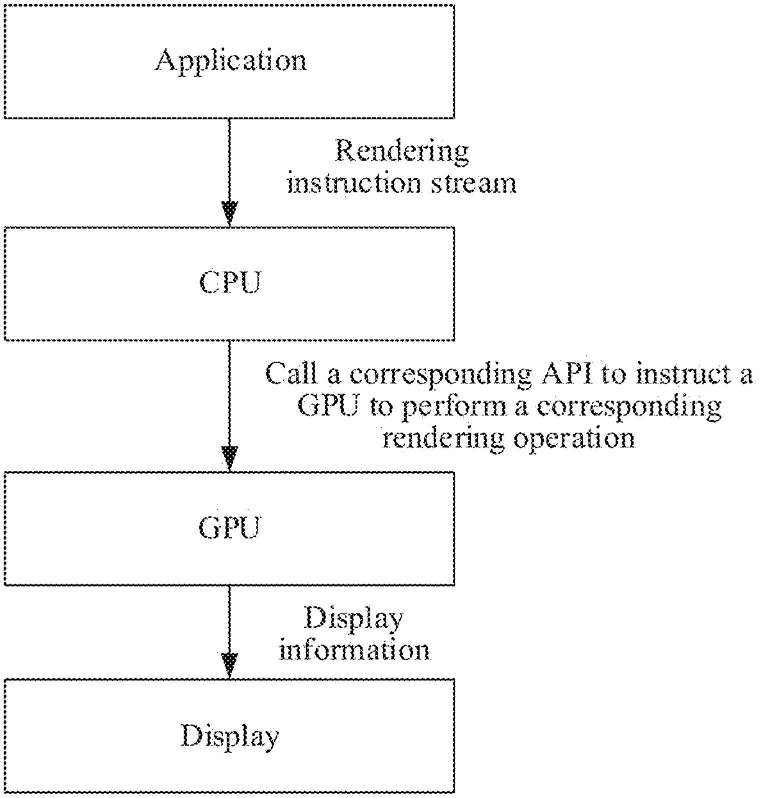
FIG. 1 is a schematic logic diagram of transmitting an instruction stream during rendering of an image.

For example, referring to FIG. 1, when a frame image needs to be displayed, the application may deliver a rendering instruction stream, to instruct the electronic device to perform a rendering operation based on the rendering instruction stream. A central processing unit (CPU) of the electronic device may receive the rendering instruction stream, and call, based on the rendering instruction stream, a corresponding application programming interface (API) in a rendering environment installed in the electronic device. The CPU may call the API to instruct a graphics processing unit (GPU) with an image rendering capability in the electronic device to perform the corresponding rendering operation. A rendering result obtained by the GPU after performing a series of rendering operations may correspond to display information. In some implementations, the display information may include color information, brightness information, depth data, normal information, and the like corresponding to each pixel point of a current frame image. When the frame image needs to be displayed, the display may obtain the rendering result and perform corresponding display based on the rendering result.

A process of obtaining display information of another frame image of the video stream is similar to that in FIG. 1. To be specific, when a plurality of frame images need to be quickly displayed, the electronic device needs to perform a corresponding rendering operation based on each rendering instruction stream delivered by the application, to obtain display information of the corresponding frame images.

Currently, to provide a better display experience, higher requirements are imposed on an image processing capability of electronic devices. For example, as images displayed on electronic devices have increasing resolutions, a rendering operation for each corresponding frame image becomes more complex. In addition, as electronic devices display video streams at increasing frame rates (or screen refresh rates), electronic devices need to render and obtain frame images more quickly. If a real-time rendering operation is performed on each frame image based on a rendering instruction stream delivered by an application, as shown in FIG. 1, obtaining of a rendering result may fail to satisfy a display speed, resulting in problems such as picture freezing. In addition, electronic devices generate relatively high power consumption during image processing.

Figure 2:
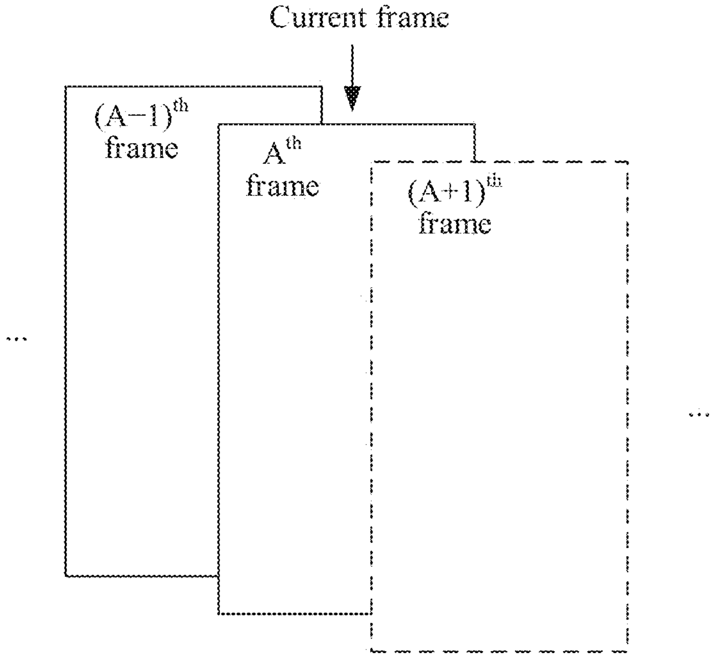
FIG. 2 is a schematic diagram of a plurality of frame images.

To cope with the above problem, a display status of a next frame image may be predicted based on a rendered frame image by using a frame image prediction technology. Display information of the next frame image may be obtained without a need to perform a rendering operation on the next frame image. For example, as shown in FIG. 2, an example in which a current frame image is an $A^{th}$ frame image is used. After rendering the $A^{th}$ frame image and a preceding frame image (for example, an $(A-1)^{th}$ frame image), an electronic device may predict an $(A+1)^{th}$ frame image based on the $(A-1)^{th}$ frame image and the $A^{th}$ frame image.

Figure 3:
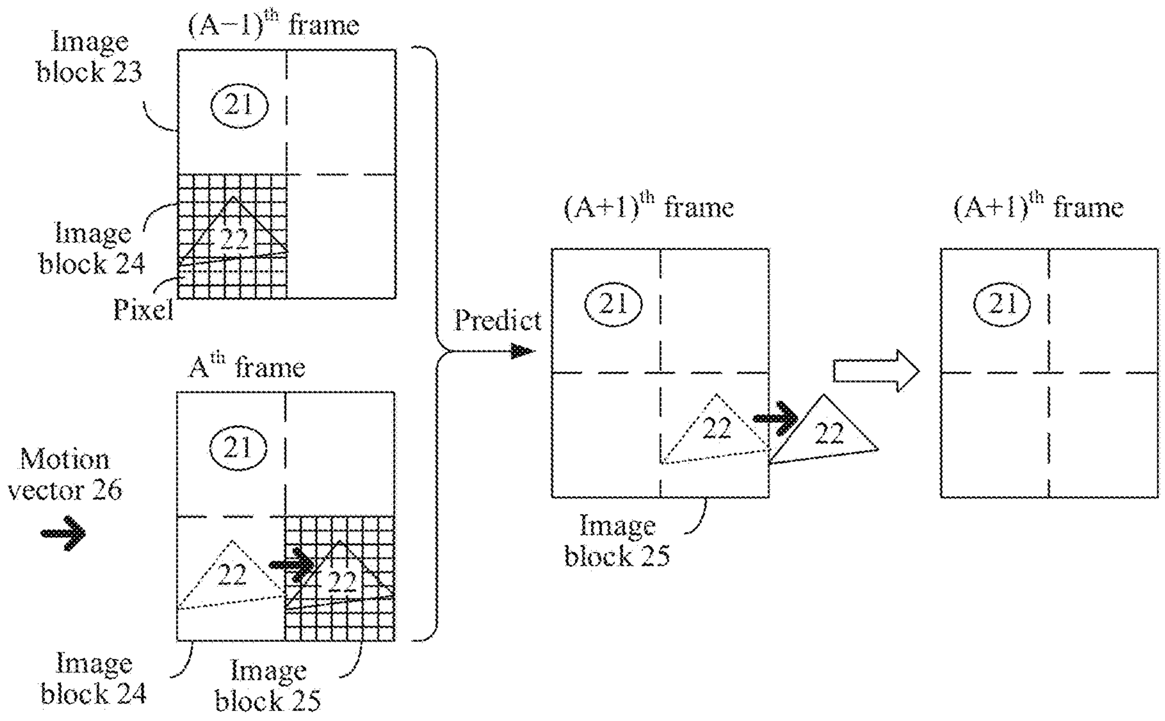
FIG. 3 is a schematic diagram of a solution for predicting a future frame image.

FIG. 3 shows an example of a frame image prediction solution. As shown in FIG. 3, the $(A-1)^{th}$ frame image may include an object 21 and an object 22. The $A^{th}$ frame image may also include the object 21 and the object 22. A position of the object 21 in the $(A-1)^{th}$ frame image is the same as that in the $A^{th}$ frame image. In other words, the object 21 does not move. A position of the object 22 in the $(A-1)^{th}$ frame image is different from that in the $A^{th}$ frame image. In other words, the object 22 moves.

In this example, the electronic device may divide the frame image into a plurality of image blocks. Each image block includes a plurality of pixel points. For example, as shown in FIG. 3, in the $(A-1)^{th}$ frame image, the object 21 may be located in a region of an image block 23, and the object 22 may be located in a region of an image block 24. In the $A^{th}$ frame image, the object 21 is still located in the region of the image block 23, while the object 22 moves to an image block 25. The electronic device may determine a motion vector of each image block between two adjacent frame images in a pixel level.

The image block 23 is used as an example. For each pixel point included in the image block 23, the electronic device may compare color information of the image block 23 at corresponding positions in the $(A-1)^{th}$ frame image and the $A^{th}$ frame image, to determine whether color information of each pixel included in the image block 23 changes between the two frame images. In the example shown in FIG. 3, when determining that the color information of each pixel included in the image block 23 in the two frame images is the same, the electronic device may determine that a motion vector of the image block 23 is 0. In other words, the image block 23 is not moved between the two frame images. In this case, the electronic device may predict that the image block 23 is still in a previous moving state, that is, is stationary in the $(A+1)^{th}$ frame image.

The image block 24 is used as an example. For each pixel point included in the image block 24, the electronic device may compare color information of the image block 24 at corresponding positions in the $(A-1)^{th}$ frame image and the $A^{th}$ frame image, to determine whether color information of each pixel included in the image block 24 changes between the two frame images. In the example shown in FIG. 3, the object 22 moves from the image block 24 of the $(A-1)^{th}$ frame image to the image block 25 of the $A^{th}$ frame image. In this case, the electronic device may determine that the corresponding color information of the image block 24 in the two frame images is different through color comparison of the image block 24. Next, the electronic device may use the color information of each pixel of the image block 24 of the $(A-1)^{th}$ frame image as a reference, to find an image block corresponding to the reference from other image blocks of the $A^{th}$ frame image adjacent to the image block 24. For example, the electronic device may determine that color information of the image block 25 of the $A^{th}$ frame image corresponds to the color information of the image block 24 of the $(A-1)^{th}$ frame image, which indicates that the image block 24 moves from a position of the image block 24 of the $(A-1)^{th}$ frame image to a position of the image block 25 of the $A^{th}$ frame image during switching from the $(A-1)^{th}$ frame image to the $A^{th}$ frame image. In this case, the electronic device may determine that a motion vector of the image block 24 between the $(A-1)^{th}$ frame image and the $A^{th}$ frame image is a vector from the image block 24 to the image block 25. An absolute length of the motion vector may be determined based on a distance between the corresponding color information before the image block 24 moves and the corresponding color information after the image block moves. The motion vector indicating that the image block 24 moves to the image block 25 is detonated as a motion vector 26. Apparently, during the movement of the image block 24 to the image block 25, the object 22 also moves along the motion vector 26. In this case, the electronic device may predict that the image block 25 of the $A^{th}$ frame image may still be in the previous moving state along the motion vector 26 in the $(A+1)^{th}$ frame image. Therefore, in the $(A+1)^{th}$ frame image, the image block 25 moves to outside of the frame image. Therefore, the electronic device may determine, based on a frame image prediction mechanism, that the object 22 in the image block 24 of the $(A-1)^{th}$ frame image and the object 22 in the image block 25 of the $A^{th}$ frame image move to the outside of the $(A+1)^{th}$ frame image when moving to the image. The object does not need to be displayed on the frame image.

The above operation is repeated, so that the electronic device may predict, based on a motion vector of each image block between the $(A-1)^{th}$ frame image and the $A^{th}$ frame image, content that needs to be displayed in the $(A+1)^{th}$ frame image.

It may be learned that, in the above frame image prediction solution shown in FIG. 3, the electronic device may calculate a motion vector of each image block based on a two-dimensional image (for example, a two-dimensional image corresponding to an observation space) through a color matching mechanism. A more detailed image block division indicates a larger calculation amount. Correspondingly, a prediction result is more accurate. To save a computing power, the image block is roughly divided. Although the calculation amount is reduced, the prediction result is significantly affected. In addition, the calculation process based on the color matching mechanism also introduces relatively large computing power overheads and power consumption.

To resolve the above problem, an embodiment of this application provides an image processing method, which enables an electronic device to calculate motion vectors of a dynamic object and a static object separately. For example, a full-screen motion vector corresponding to the static object is calculated from a perspective of a three-dimensional space in combination with depth data during image rendering. For another example, matching processes of different models are simplified through hash matching based on a spatial coordinate of a normalized device coordinate (NDC) and a relevant rendering parameter corresponding to each drawing instruction (Drawcall), so as to reduce computing overheads for calculation of the motion vector of the dynamic object.

The solution provided in embodiments of this application is described below in detail with reference to the drawings.

The solution provided in embodiments of this application is applicable to an electronic device having a display function. The electronic device may include at least one of a mobile phone, a foldable electronic device, a tablet computer, a desktop computer, a laptop computer, a handheld computer, a notebook computer, an ultra-mobile personal computer (UMPC), a netbook, a cellular phone, a personal digital assistant (PDA), an augmented reality (AR) device, a virtual reality (VR) device, an artificial intelligence (AI) device, a wearable device, an on-board device, a smart home device, and a smart city device. A specific type of the electronic device is not specially limited in embodiments of this application.

In an example, in some embodiments, from a perspective of hardware composition, the electronic device involved in embodiments of this application may include a processor, an external memory interface, an internal memory, a universal serial bus (USB) interface, a charge management module, a power management module, a battery, an antenna 1, an antenna 2, a mobile communication module, a wireless communication module, an audio module, a speaker, a receiver, a microphone, a headset jack, a sensor module, a button, a motor, an indicator, a camera, a display, a subscriber identification module (SIM) card interface, and the like. The sensor module may include a pressure sensor, a gyroscope sensor, a barometric pressure sensor, a magnetic sensor, an acceleration sensor, a distance sensor, an optical proximity sensor, a fingerprint sensor, a temperature sensor, a touch sensor, an ambient light sensor, a bone conduction sensor, and the like.

It should be noted that, the above hardware composition does not constitute a specific limitation on the electronic device. In some other embodiments, the electronic device may include more or fewer components, some merged components, some split components, or different component arrangements.

Figure 4:
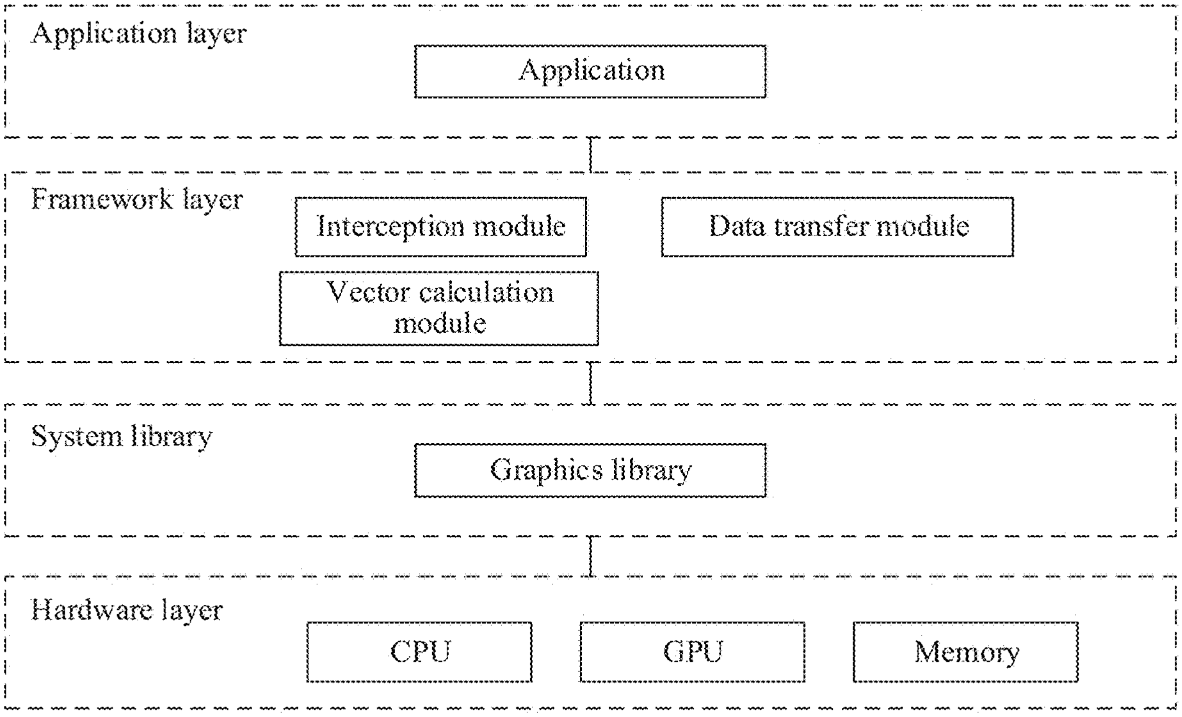
FIG. 4 is a schematic diagram of software composition of an electronic device according to an embodiment of this application.

In some other embodiments, the electronic device involved in embodiments of this application may further have software division. An example in which an Android® operating system runs in the electronic device is used. In an example, FIG. 4 is a schematic diagram of software composition of an electronic device according to an embodiment of this application. As shown in FIG. 4, the electronic device may include an application (APP) layer, a framework layer, a system library, a hardware layer, and the like.

The application layer may also be referred to as an application program layer. In some implementations, the application layer may include a series of application packages. The application packages may include applications such as Camera, Gallery, Calendar, Phone, Map, Navigation, WLAN, Bluetooth, Music, Video, and SMS messages. In this embodiment of this application, the application packages may further include an application that needs to display an image or a video to a user by image rendering. The video may be understood as a plurality of continuously played frame images. In an example, the application that needs to perform image rendering may include game applications, such as Genshin Impact®, Game for Peace®, and Honor of Kings®.

The framework layer may also be referred to as an application framework layer.

The framework layer provides an API and a programming framework for applications at the application layer. The framework layer includes predefined functions. In an example, the framework layer may include a window manager, a content provider, a view system, a resource manager, a notification manager, an activity manager, an input manager, and the like. The window manager provides a window manager service (WMS). The WMS may be used for window management, window animation management, and surface management, and serve as a transfer station of an input system. The content provider is configured to store and obtain data, and enable the data to be accessible to an application. The data may include a video, an image, audio, calls that are made and answered, a browsing history, a bookmark, a phonebook, and the like. The view system includes visual controls such as a control configured to display a text and a control configured to display a picture. The view system may be configured to construct an application. A display interface may be composed of one or more views. For example, a display interface including an SMS notification icon may include a view configured to display a text and a view configured to display a picture. The resource manager provides various resources such as a localized character string, an icon, a picture, a layout file, and a video file for an application. The notification manager enables an application to display notification information in a status bar, to convey a message of a notification type. The message may disappear automatically after a short stay without user interaction. For example, the notification manager is configured to provide a notification indicating download completion, a message notification, and the like. The notification manager may alternatively be a notification that appears on a top status bar of a system in a form of a graph or a scroll bar text, for example, a notification of an application that runs on a backend, or may be a notification that appears on a screen in a form of a dialog window. For example, text information is prompted on the status bar, a tone is made, the electronic device vibrates, or an indicator light flashes. The activity manager may provide an activity manager service (AMS). The AMS may be configured to enable, switch, and schedule a system component (for example, an activity, a service, the content provider, a broadcast receiver) and manage and schedule an application process. The input manager may provide an input manager service (IMS). The IMS may be configured to manage a system input, for example, a touch screen input, a button input, and a sensor input. The IMS obtains an event from an input device node, and allocates the event to an appropriate window through interaction with the WMS.

In this embodiment of this application, one or more functional modules may be arranged in the framework layer, to implement the solution provided in embodiments of this application. In an example, an interception module, a data transfer module, a vector calculation module, and the like may be arranged in the framework layer. The modules are arranged to support the electronic device to implement the image processing method provided in embodiments of this application. Specific functions and implementations of the modules are described below in detail.

As shown in FIG. 4, a system library including a graphics library is further arranged in the electronic device. In different implementations, the graphics library may include at least one of an open graphics library (OpenGL), an OpenGL for Embedded Systems (OpenGL ES), Vulkan, and the like. In some embodiments, the system library may include other modules, such as a surface manager, a media framework, a standard C library (libc), SQLite, and Webkit.

The surface manager is configured to manage a display subsystem, and provide fusion of two-dimensional (2D) and three-dimensional (3D) layers for a plurality of applications. The media framework supports playback and recording in a plurality of common audio and video formats, and supports a static image file and the like. A media library supports a plurality of audio and video encoding formats, such as Moving Pictures Experts Group 4 (MPEG4), H.264, Moving Picture Experts Group Audio Layer 3 (MP3), an advanced audio coding (AAC), adaptive multi-rate (AMR), Joint Photographic Experts Group (JPEG or JPG), and portable network graphics (PNG). The OpenGL ES and/or the Vulkan provides drawing and operation of 2D graphics and 3D graphics in an application. The SQLite provides a light-weight relational database for applications of the electronic device.

After an application delivers a rendering command, each module in the framework layer may call a corresponding API in the graphics library to instruct the GPU to perform a corresponding rendering operation.

In the example shown in FIG. 4, the electronic device may further include the hardware layer. The hardware layer may include a CPU, a GPU, and a memory with a storage function (for example, an internal memory). In some implementations, the CPU may be configured to control the modules at the framework layer to implement respective functions. The GPU may be configured to perform corresponding rendering based on an API in a graphics library (for example, the OpenGL ES) called by instructions processed by the modules at the framework layer.

The solutions provided in embodiments of this application are applicable to the electronic device shown in FIG. 4. It should be noted that, the example shown in FIG. 4 does not constitute a specific limitation on the electronic device. In some other embodiments, the electronic device may include more or fewer components. Specific composition of the electronic device is not limited in embodiments of this application.

As an example, in the technical solutions provided in embodiments of this application, corresponding data may be collected and buffered during rendering operations on a current frame image and a preceding frame image. An example in which the current frame image is an $N^{th}$ frame image and the electronic device further collects data of an $(N-1)^{th}$ frame image is used.

Referring to FIG. 4, the interception module arranged in the framework layer may be configured to intercept a required instruction stream during a rendering operation of each frame image. For example, the interception module may be configured to intercept a rendering instruction stream delivered by an application. In some other embodiments, the interception module may further have a simple determination capability. For example, the interception module may determine, depending on whether model information corresponding to a rendering instruction stream is updated, the rendering instruction stream is used for drawing a static object or a dynamic object. The model information may include coordinate data and the like of a to-be-drawn model. For another example, the interception module may further identify depth information of a current frame image and/or relevant data of a model-view-projection (MVP) matrix included in a current instruction stream based on a preset function or a parameter carried in the function. In the following description, the depth data and the MVP matrix may be collectively referred to as an intermediate rendering variable.

The interception module may be further configured to send an instruction stream used for instructing to render a dynamic object to the data transfer module for subsequent processing. The interception module may be further configured to send an instruction stream used for instructing to render a static object to the GPU of the electronic device for subsequent processing. The interception module may be further configured to send an instruction stream including an intermediate rendering variable to the data transfer module for subsequent processing.

The data transfer module may be configured to perform a corresponding data transfer operation based on the instruction stream from the interception module. In an example, in some implementations, when receiving the rendering instruction stream for the dynamic object, the data transfer module may enable a transform feedback function, and deliver the rendering instruction stream for the dynamic object to the GPU, so that the GPU performs a corresponding rendering operation. Based on the transform feedback function, the data transfer module obtains data generated during the rendering operation performed by the GPU. For example, the data transfer module may obtain coordinate data in an NDC space corresponding to the dynamic object based on the transform feedback function. In this example, the data transfer module may transfer the coordinate data in the NDC space corresponding to the dynamic object to the memory of the electronic device for subsequent use. In some other implementations, the data transfer module may store the intermediate rendering variable in an intermediate rendering variable buffer pre-created in the memory.

It should be understood that, based on a native image rendering logic, the above instruction stream intercepted by the interception module is ultimately sent to the GPU for a relevant rendering operation. The data in the rendering process is invisible to the electronic device (for example, the CPU of the electronic device). Therefore, to facilitate subsequent calculation of a motion vector between adjacent frame images, in this application, the electronic device may back up data for subsequent use in the memory of the electronic device through the data transfer module.

In this way, after the $(N-1)^{th}$ frame image and the $N^{th}$ frame image are rendered, an MVP matrix of each frame image, depth data of each frame image, and coordinate data corresponding to a dynamic object included in each frame image may be stored at a specific position in the memory of the electronic device.

The data stored at the specific position may be used for supporting the electronic device to predict an $(N+1)^{th}$ frame image. In an example, in some embodiments, the vector calculation module in the electronic device may calculate a motion vector of a static object corresponding to the $(N-1)^{th}$ frame image to the $N^{th}$ frame image based on the MVP matrix of each frame image and the depth data of each frame image. The motion vector of the static object may alternatively correspond to a full-screen motion vector. In some other embodiments, the vector calculation module in the electronic device may calculate a motion vector of a dynamic object corresponding to the $(N-1)^{th}$ frame image to the $N^{th}$ frame image based on the coordinate data corresponding to the dynamic object included in each frame image. The electronic device may predict a specific position of each object in the $(N+1)^{th}$ frame image based on a rendering result of the $N^{th}$ frame image, the motion vector of static object, and the motion vector of the dynamic object, thereby achieving prediction of the $(N+1)^{th}$ frame image.

In this way, the electronic device may calculate the motion vectors of the static object and the dynamic object separately. The full-screen motion vector calculated based on three-dimensional information such as the MVP matrix and the depth data is much more accurate than a current motion vector calculated based on two-dimensional information. In addition, decoupling the calculation of the motion vector of the dynamic object from the calculation of the full-screen motion vector may enable more accurate calculation of the motion vector of the dynamic object and more accurate calculation of a more precise operation, thereby achieving a more accurate prediction effect for the dynamic object in the $(N+1)^{th}$ frame image.

A specific implementation of the above solution is described in combination with interaction among the modules.

Figure 5:
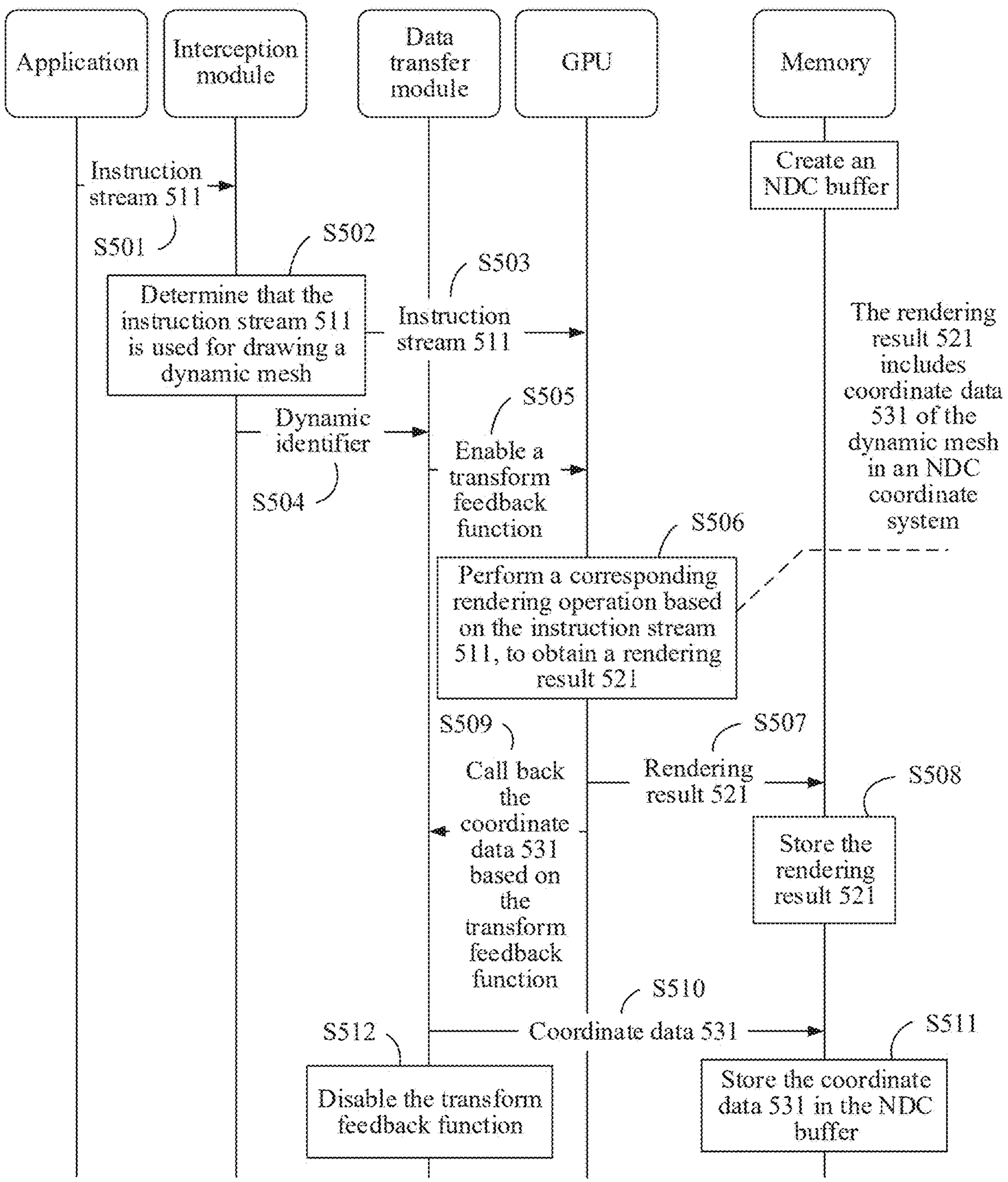
FIG. 5 is a schematic diagram of module interaction of an image processing method according to an embodiment of this application.

In an example, FIG. 5 is a schematic diagram of module interaction of an image processing method according to an embodiment of this application. The solution is applicable to a rendering process of any frame image (for example, an $(N-1)^{th}$ frame image or an $N^{th}$ frame image), to achieve backup of coordinate data of a dynamic object by an electronic device.

As shown in FIG. 5, the solution may include the following steps:

S501: An application delivers an instruction stream 511.

It may be understood that, the application may deliver an instruction stream including a plurality of Drawcalls in a process of instructing an electronic device to render a frame image. In this example, the instruction stream 511 may correspond to a Drawcall, and is included in instruction streams delivered by the application during rendering of a frame image.

The Drawcall corresponding to the instruction stream 511 may be used for instructing the electronic device to draw a dynamic object in a current frame image.

It should be noted that, in this example, the instruction stream 511 may correspond to a drawing instruction for a dynamic object. When the frame image includes a plurality of dynamic objects that need to be drawn separately, the application respectively delivers Drawcalls respectively corresponding to the dynamic objects. In this way, the electronic device may perform a process shown in FIG. 5 for a Drawcall corresponding to each dynamic object, to achieve backup of coordinate data of each dynamic object.

S502: An interception module determines that the instruction stream 511 is used for drawing a dynamic mesh. The dynamic mesh corresponds to a mesh of the dynamic object. Correspondingly, a mesh of a static object may be referred to as a static mesh.

In this example, the interception module may have a capability of determining whether a current instruction stream is used for instructing to draw a dynamic mesh or a static mesh. In an example, the interception module may determine that the instruction stream 511 is used for drawing the dynamic mesh when model information of a to-be-drawn model indicated in the instruction stream 511 is updated. Correspondingly, the interception module may determine that the instruction stream 511 is used for drawing the static mesh when the model information of the to-be-drawn model indicated in the instruction stream 511 is not updated.

In a possible implementation, the interception module may determine whether model information (for example, coordinate information) corresponding to a same model changes between a current Drawcall and a preceding Drawcall, to determine whether a model to be drawn by using the current Drawcall is a dynamic mesh or a static mesh. For example, the interception module may determine whether coordinate information in a frame buffer storing the corresponding model is the same as coordinate information in a preceding frame image in the same frame buffer after the current Drawcall is delivered, thereby achieving the above determination mechanism.

After the current Drawcall is delivered, when data in the frame buffer storing the coordinate information is the same as the coordinate data in the preceding frame image in the same frame buffer, it indicates that the coordinate data of the model is not updated. In other words, the model is a static mesh.

After the current Drawcall is delivered, when the data in the frame buffer storing the coordinate information is at least partially different from the coordinate data in the preceding frame image in the same frame buffer, it indicates that the coordinate data of the model is updated. In other words, the model is a dynamic mesh.

An example in which the instruction stream 511 is used for drawing the dynamic mesh is used.

S503: The interception module calls back the instruction stream 511 to a GPU.

In an example, the interception module may call back the intercepted instruction stream to the GPU while intercepting an instruction stream from an application and determining a subsequent policy, to achieve a native logic. For example, the interception module may call back the instruction stream 511 to the GPU while intercepting the instruction stream 511 and determining that the instruction stream 511 is used for drawing a dynamic mesh, so that the GPU makes a corresponding response.

S504: The interception module sends a dynamic identifier to a data transfer module.

The dynamic identifier may indicate that the current Drawcall is used for drawing the dynamic mesh.

In this example, after determining that the current Drawcall (that is, the instruction stream 511) corresponds to the drawing of the dynamic mesh, the interception module may notify, through the dynamic identifier, the data transfer module to back up corresponding data, for example, to back up the coordinate data of the dynamic object.

S505: The data transfer module instructs the GPU to enable a transform feedback function.

The transform feedback function may be configured to collect data during a subsequent rendering operation performed by the GPU. In an example, by enabling the transform feedback function, the GPU may feed back, to the data transfer module, coordinate data of a current model (that is, a dynamic object corresponding to the instruction stream 511) generated during a rendering operation performed based on the instruction stream 511.

In some embodiments, the transform feedback function includes the transform feedback function. In this case, the data transfer module may instruct the GPU to enable the transform feedback function by calling a function configured to enable the transform feedback function.

S506: The GPU performs a corresponding rendering operation based on the instruction stream 511, to obtain a rendering result 521.

In combination with the above description, the interception module may call back the instruction stream 511 to the GPU while intercepting the instruction stream 511, thereby achieving a native rendering logic.

In an example, the GPU may receive the instruction stream 511 from the interception module, and perform the corresponding rendering operation, to obtain the rendering result 521. It should be noted that, for a specific implementation process of the rendering operation performed by the GPU based on the instruction stream 511, refer to the process shown in FIG. 1. To be specific, the interception module may call a corresponding API based on the instruction stream 511, so that the GPU performs a corresponding rendering operation based on the API. In the description of this embodiment of this application, an implementation of the rendering operation performed by the GPU based on the instruction stream may adopt the above process. Details are not described below.

In this way, the electronic device can achieve a rendering response to the instruction stream 511, and obtain the rendering result of the corresponding dynamic mesh.

S507: The GPU sends the rendering result 521 to a memory.

S508: The memory stores the rendering result 521.

Through S507 to S508, the electronic device may store the rendering result 521 in the memory, to obtain display information corresponding to the current frame image through operations such as synthesis and denoising based on the rendering result 521 and another rendering result of the current frame image.

S509: The GPU calls back coordinate data 531 based on the transform feedback function.

In this example, in S505, the data transfer module is configured to obtain, by enabling the transform feedback function, the coordinate data of the dynamic mesh the current Drawcall instructs to draw.

Therefore, in step S509, the GPU may call back, after obtaining coordinate data 531 corresponding to the current Drawcall, the coordinate data 531 to the GPU through the transform feedback function while performing the rendering operation based on the instruction stream 511.

Figure 6:
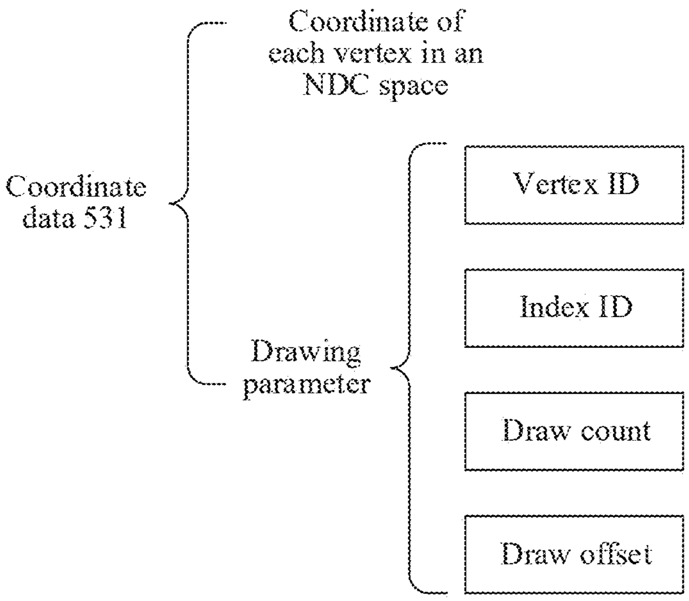
FIG. 6 is a schematic diagram of composition of coordinate data according to an embodiment of this application.

In an example, as shown in FIG. 6, the coordinate data may include a specific coordinate of each vertex of the model corresponding to the Drawcall in an NDC space. The specific coordinate in the NDC space may be abbreviated as an NDC coordinate.

It should be understood that, when the application instructs the electronic device to draw a model, a vertex coordinate of the model may be carried in the instruction stream. The vertex coordinate may be based on a local space established by the model. To enable the electronic device to draw different models into a world space displayed in a frame image, the application may further send an MVP matrix to the electronic device. Based on the MVP matrix, the electronic device may transform the vertex coordinate based on the local space to a world space coordinate, an observation space coordinate, and a clip space coordinate. The clip space coordinate may correspond to a coordinate on a display. In this example, the NDC coordinate may be a normalized device coordinate in the local space after the MVP matrix is transformed. Based on the NDC coordinate and the MVP matrix, the electronic device may further restore a coordinate of each vertex in a world space. For example, the corresponding coordinate in the world space may be obtained by multiplying the NDC coordinate by an inverse matrix of the MVP matrix and then performing normalization restoration based on a w component.

In addition, in this embodiment of this application, the coordinate data called back by the GPU to the data transfer module may further include a drawing parameter corresponding to the current Drawcall.

The drawing parameters may include at least one of a vertex identifier (vertex ID), an index identifier (Index ID), a draw count, a draw offset, and the like.

It should be understood that, the drawing parameter may be an essential parameter for the rendering operation performed by the GPU, and may be carried in the instruction stream 511 for delivery to the GPU. In a same frame image, different Drawcalls correspond to different drawing parameters. In other words, a drawing parameter may be used for identifying a different Drawcall. In other words, the drawing parameter may be used for identifying a different dynamic mesh. In this way, the electronic device may identify by matching a corresponding dynamic mesh in a different frame image based on the drawing parameter in the coordinate data.

In some other embodiments of this application, the drawing parameter may be sent by the interception module to the data transfer module. In an example, the interception module may send the drawing parameter in the instruction stream 511 to the data transfer module after identifying the instruction stream. In this case, when the GPU calls back the coordinate data, the drawing parameter may not be carried.

S510: The data transfer module sends the coordinate data 531 to the memory.

S511: The memory stores the coordinate data 531 in an NDC buffer.

In this embodiment of this application, the data transfer module may back up data required for subsequent prediction of a future frame (for example, an $(N+1)^{th}$ frame) during rendering of each frame image.

In an example, the data transfer module may obtain the coordinate data 531 of the dynamic mesh from the GPU, and store the coordinate data 531 at a specific position in the memory of the electronic device.

The specific position at which the coordinate data is stored may be pre-created. Referring to FIG. 5, the specific position may be a NDC buffer pre-created in the memory.

Figure 7:
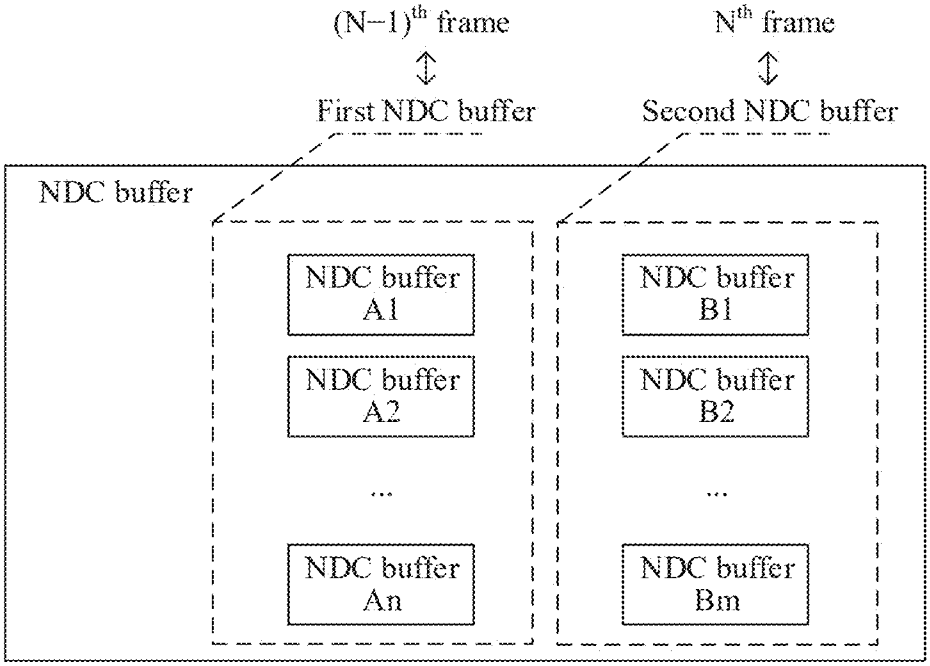
FIG. 7 is a schematic diagram of an NDC buffer according to an embodiment of this application.

FIG. 7 shows an example of an NDC buffer. In the example shown in FIG. 7, an NDC buffer including a plurality of sub-buffers may be pre-created in the memory of the electronic device. The plurality of sub-buffers may form two buffer groups, for example, a first NDC buffer and a second NDC buffer. Each buffer group may be configured to store coordinate data of a dynamic mesh of a frame image. For example, the first NDC buffer may be configured to store coordinate data of a dynamic mesh of an $(N-1)^{th}$ frame image. For another example, the second NDC buffer may be configured to store coordinate data of a dynamic mesh of an $N^{th}$ frame image.

As shown in FIG. 7, the first NDC buffer may include an NDC buffer A1 to an NDC buffer An. Each of the NDC buffer A1 to the NDC buffer An is a sub-buffer of the NDC buffer. The sub-buffer may correspondingly store the coordinate data of the dynamic mesh of the $(N-1)^{th}$ frame image. Correspondingly, the second NDC buffer may include an NDC buffer B1 to an NDC buffer Bm. Each of the NDC buffer B1 to the NDC buffer Bm may correspond to a sub-buffer. The sub-buffer may correspondingly store the coordinate data of the dynamic mesh of the $N^{th}$ frame image.

An example in which the $(N-1)^{th}$ frame image includes n dynamic meshes is used. Coordinate data of the n dynamic meshes are respectively coordinate data A1 to coordinate data An. Based on the above steps S501 to S511, for each coordinate data, the data transfer module may store the coordinate data in an NDC buffer.

Figure 8:
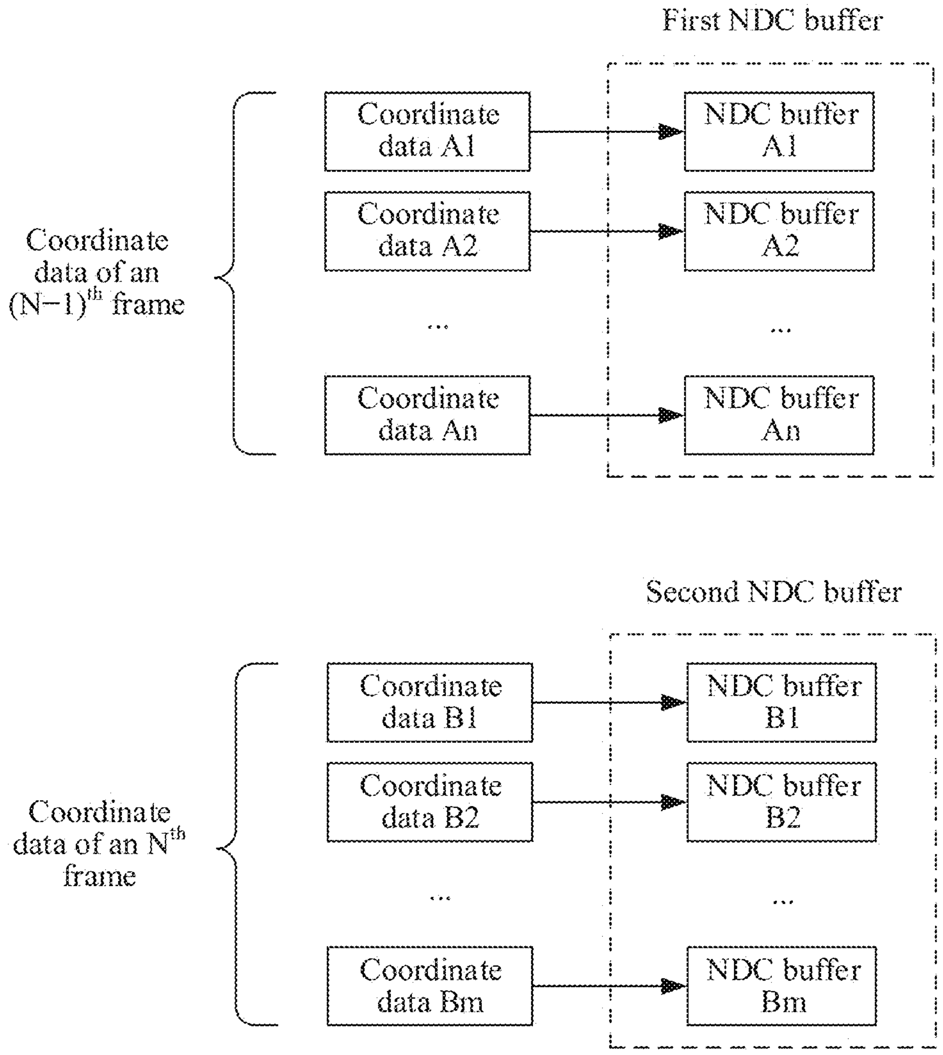
FIG. 8 is a schematic diagram of storing coordinate data according to an embodiment of this application.

In an example, referring to FIG. 8, an example in which the instruction stream 511 is used for instructing to render a dynamic mesh corresponding to the coordinate data A1 of the $(N-1)^{th}$ frame image is used. Based on the above solution implementation, the data transfer module may store the coordinate data A1 in a sub-buffer of the first NDC buffer. For example, the coordinate data A1 is stored in the NDC buffer A1.

An example in which the instruction stream 511 is used for instructing to render a dynamic mesh corresponding to the coordinate data B1 of the $N^{th}$ frame image is used. Based on the above solution implementation, the data transfer module may store the coordinate data B1 in a sub-buffer of the second NDC buffer. For example, the coordinate data B1 is stored in the NDC buffer B1.

In this way, after the $(N-1)^{th}$ frame image is rendered, the coordinate data corresponding to each dynamic mesh of the $(N-1)^{th}$ frame image may be stored in the first NDC buffer. Similarly, after the $N^{th}$ frame image is rendered, coordinate data corresponding to each dynamic mesh of the $N^{th}$ frame image may be stored in the second NDC buffer.

Therefore, through the above steps S501 to S511, the coordinate data of all dynamic meshes can be backed up in the NDC buffer during the rendering of the $(N-1)^{th}$ frame image and the $N^{th}$ frame image.

It should be noted that, still referring to FIG. 5, when a Drawcall of each dynamic mesh ends, the data transfer module may further perform S512, that is, disable the transform feedback function. When the interception module receives a next Drawcall, the transform feedback function may be re-enabled for only the dynamic mesh based on the process shown in FIG. 5, to back up the corresponding coordinate data.

In the above examples shown in FIG. 5 to FIG. 8, the processing mechanism based on which the application delivers the rendering instruction stream for the dynamic mesh is described. A processing mechanism for an electronic device when an application delivers a rendering instruction stream for a static mesh is described below with reference to FIG. 9.

Figure 9:
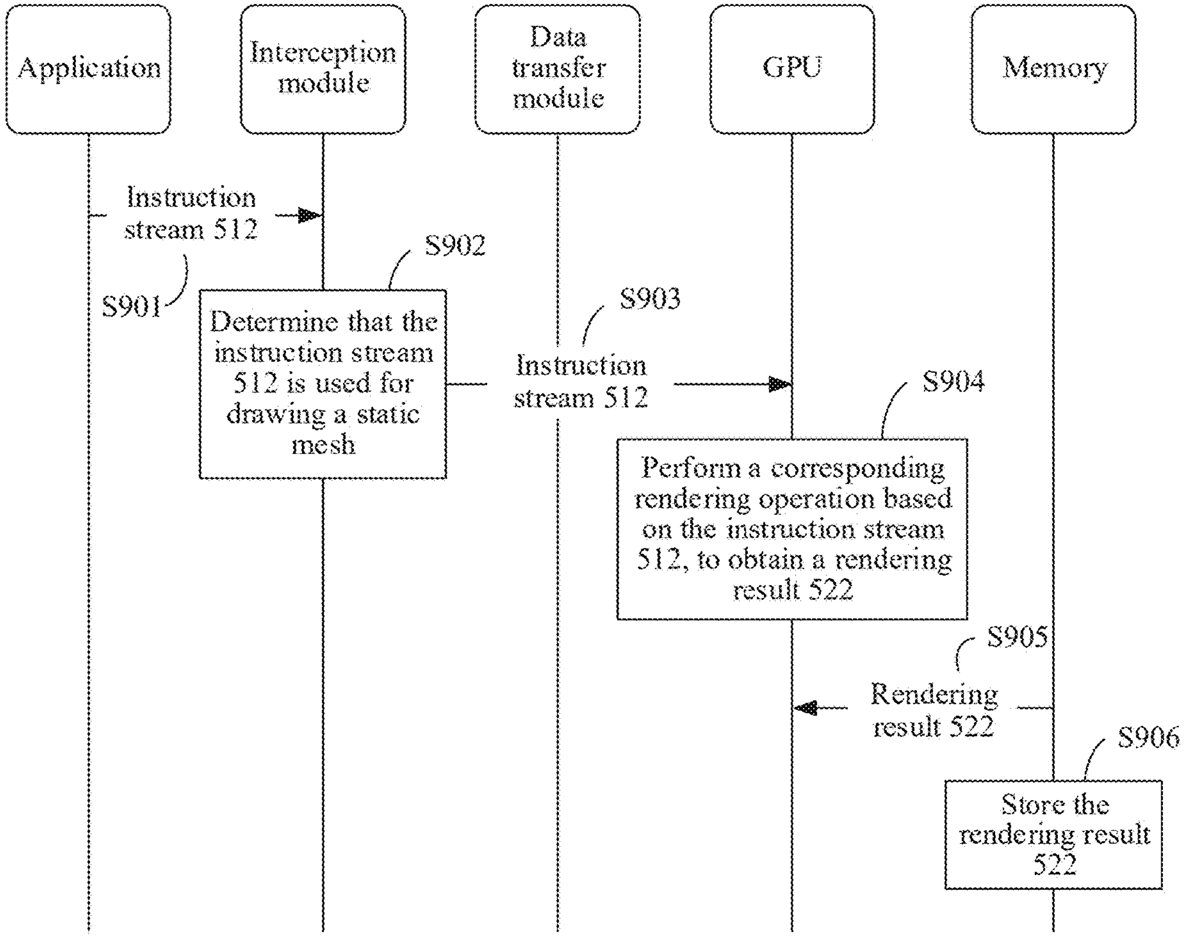
FIG. 9 is a schematic diagram of module interaction of an image processing method according to an embodiment of this application.

As shown in FIG. 9, the solution may include the following steps:

S901: An application delivers an instruction stream 512.

The Drawcall corresponding to the instruction stream 51 may be used for instructing the electronic device to draw a dynamic object in a current frame image. In combination with the description in S501 in FIG. 5, the instruction stream 512 may be one of a plurality of instruction streams sent by the application when instructing the electronic device to render an $(N-1)^{th}$ frame image and an $N^{th}$ frame image. In this example, an interception module may identify that the instruction stream 512 is used for instructing to draw a static mesh based on the following step S902, and execute a corresponding policy.

S902: An interception module intercepts the instruction stream 512, and determines that the instruction stream 512 is used for drawing a static mesh.

In combination with S502 in FIG. 5, the interception module may determine, depending on whether model information of a to-be-drawn model indicated in the instruction stream 512 is updated, whether the instruction stream 512 is used for drawing the static mesh. In an example, after a current Drawcall is delivered, when the interception module determines that data in a frame buffer storing coordinate information of a model corresponding to the instruction stream 512 is the same as coordinate data in a preceding frame image in the same frame buffer, it indicates that the coordinate data of the model corresponding to the instruction stream 512 is not updated. In other words, the model is a static mesh.

In this example, the electronic device does not need to back up coordinate data of the static mesh. Therefore, when it is determined that the instruction stream 512 is used for instructing to draw the static mesh, S903 may be triggered and performed.

S903: The interception module calls back the instruction stream 512 to a GPU.

S904: The GPU performs a corresponding rendering operation based on the instruction stream 512, to obtain a rendering result 522.

S905: The GPU sends the rendering result 522 to a memory.

S906: The memory stores the rendering result 522.

Through the above steps S903 to S906, the electronic device may perform the rendering operation on the static mesh based on a native logic, to obtain the corresponding rendering result 522. Therefore, display data of a current frame image may be obtained through operations such as synthesis and denoising in combination with the rendering result 522 and another rendering result of the current frame image.

It should be noted that, when the application instructs the electronic device to draw a frame image, in addition to the above instruction stream used for instructing to draw the static mesh or the dynamic mesh, another rendering instruction stream needs to be delivered to the electronic device. For example, the application may deliver intermediate rendering variables such as an MVP matrix and depth data for deep rendering. In this example, the electronic device may further back up the intermediate rendering variables for subsequent determination of a full-screen motion vector.

Figure 10:
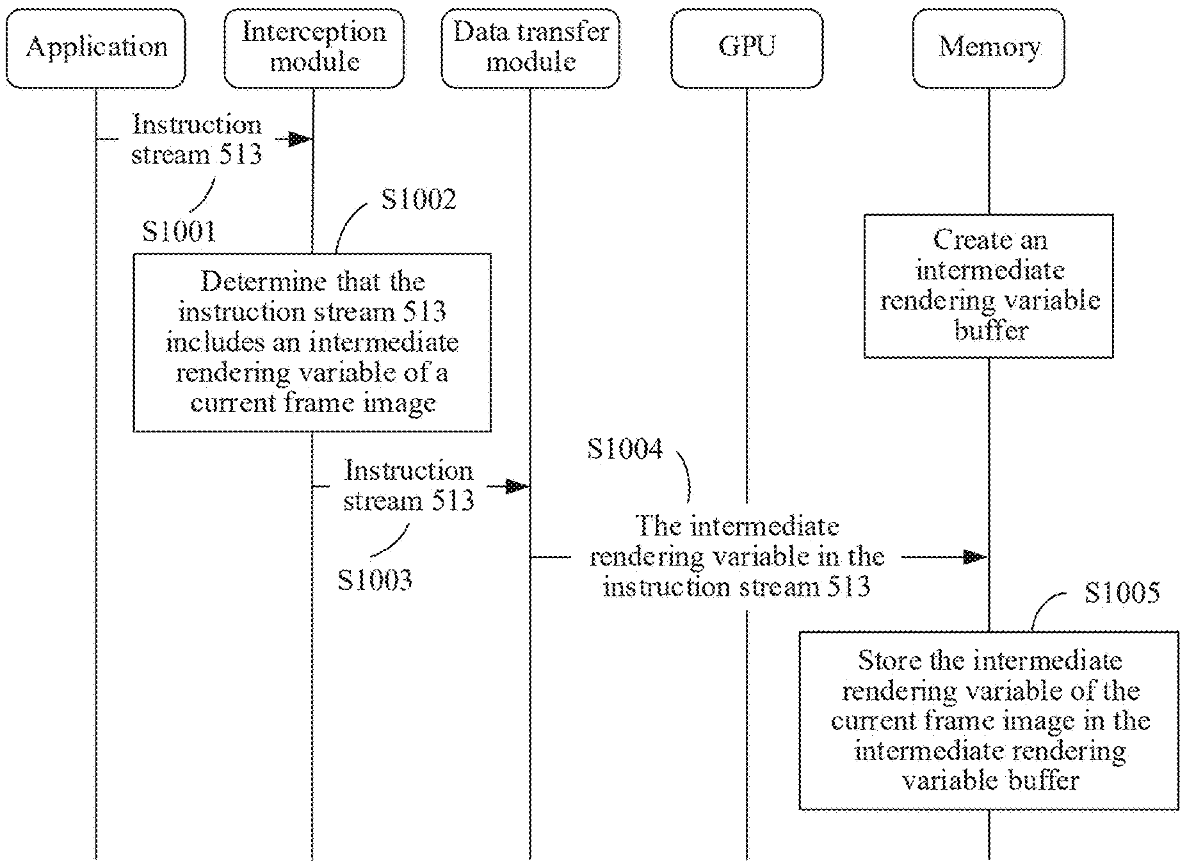
FIG. 10 is a schematic diagram of module interaction of an image processing method according to an embodiment of this application.

As an example, FIG. 10 is a schematic diagram of interaction between modules of another image processing method according to an embodiment of this application. Through the solution, backup of intermediate rendering variables can be achieved. The solution is applicable to a rendering process of any frame image. As shown in FIG. 10, the solution may include the following steps:

S1001: An application delivers an instruction stream 513.

The instruction stream 513 may carry an intermediate rendering variable corresponding to a current frame image.

In an example, when starting to render a frame image, the application may send various data required during the rendering of the frame image to an electronic device. For example, the application may send an intermediate rendering variable including an MVP matrix and depth data to the electronic device through the instruction stream 513.

S1002: An interception module determines that the instruction stream 513 includes an intermediate rendering variable of a current frame image.

In this example, the interception module may determine that the instruction stream 513 includes the intermediate rendering variable based on a preset function or a parameter carried in the function.

It should be understood that, for a determined rendering platform, a manner of transmitting the MVP matrix is generally relatively fixed. For example, the application may transmit the MVP matrix through a function carrying a uniform parameter. In this case, when the instruction stream 513 includes the function carrying the uniform parameter, the interception module may determine that the instruction stream 513 includes an MVP function.

For identification of the depth data, the interception module may obtain the depth data based on corresponding information corresponding to multiple render targets (MRTs). Based on the MRT technology, the electronic device may output an RGBA color, a normal, depth data, or a texture coordinate to a plurality of buffers through a rendering. Output buffers corresponding to the MRT may be indicated by the application through the instruction stream. In this application, when the instruction stream 513 is used for instructing to output a plurality of rendering results to different buffers at one time, the interception module may determine that the instruction stream 513 includes a command used for instructing to perform MRT rendering. The command used for instructing to perform MRT rendering includes a frame buffer configured to store the depth data. In other words, when determining that the instruction stream 513 is used for instructing to perform MRT rendering, the interception module may determine that the depth data of the current frame image may be obtained through the instruction stream 513. In some embodiments, the depth data of the current frame image may also be referred to as a full-screen depth map.

In this way, the interception module may determine a transmission instruction for the MVP matrix based on the function carrying the uniform parameter. The interception module may further determine a transmission instruction for the depth data based on the command used for instructing to perform MRT rendering. The command used for instructing to perform MRT rendering may correspond to the instruction used for instructing to output a plurality of rendering results to different buffers at one time.

In this example, the transmission instruction for the MVP matrix and the transmission instruction for the depth data may be included in the instruction stream 513.

S1003: The interception module sends the instruction stream 513 to a data transfer module.

S1004: The data transfer module sends the intermediate rendering variable in the instruction stream 513 to a memory.

S1005: The memory stores the intermediate rendering variable of the current frame image in an intermediate rendering variable buffer.

In combination with the description in S1002, the data transfer module may obtain an MVP matrix of the current frame image based on the function carrying the uniform parameter, and send the MVP matrix to the memory for storage.

In addition, the data transfer module may determine an ID of the frame buffer for storing the depth data based on the command used for instructing to perform MRT rendering. In this case, the data transfer module may read the depth data from the corresponding frame buffer, and send the depth data to the memory for storage.

In this example, as shown in FIG. 10, before performing S1004 and S1005 (that is, storage into the intermediate variable buffer) the electronic device may create a corresponding storage space in the memory. For example, the electronic device may create an intermediate variable buffer in the memory.

In this way, through the solution implementation shown in FIG. 10, when any frame image is rendered, an intermediate rendering variable of the corresponding frame image can be backed up in a memory (for example, the intermediate variable buffer). In combination with the above example in FIG. 5, when any frame image is rendered, coordinate data of all dynamic meshes of the corresponding frame image may be further backed up in a memory (for example, an NDC buffer).

Figure 11:
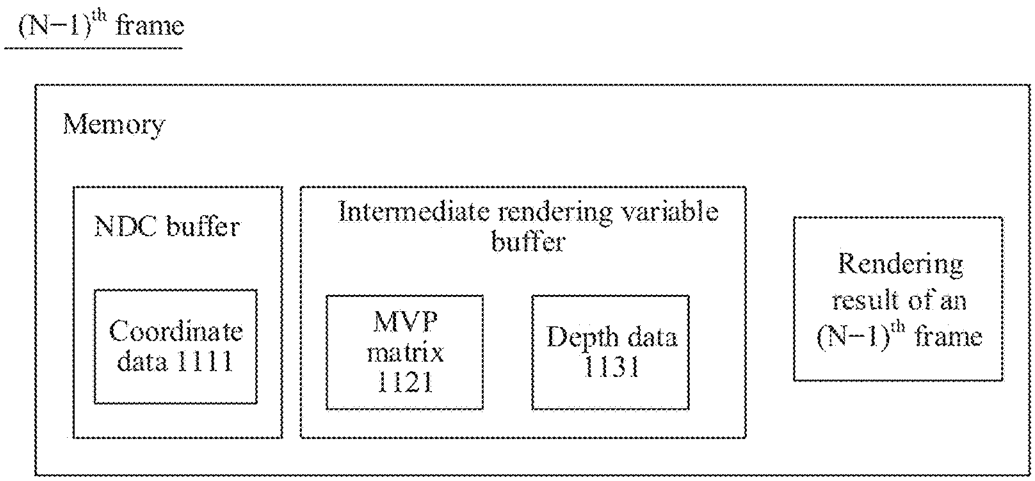
FIG. 11 is a schematic diagram of storing data by a memory according to an embodiment of this application.

In an example, after an $(N-1)^{th}$ frame image is rendered, as shown in FIG. 11, coordinate data 1111 of all dynamic meshes of the $(N-1)^{th}$ frame image may be backed up in the NDC buffer of the memory. An MVP matrix 1121 and depth data 1131 of the $(N-1)^{th}$ frame image may be backed up in the intermediate variable buffer of the memory. In addition, a rendering result corresponding to the $(N-1)^{th}$ frame image may be further stored in the memory.

Figure 12:
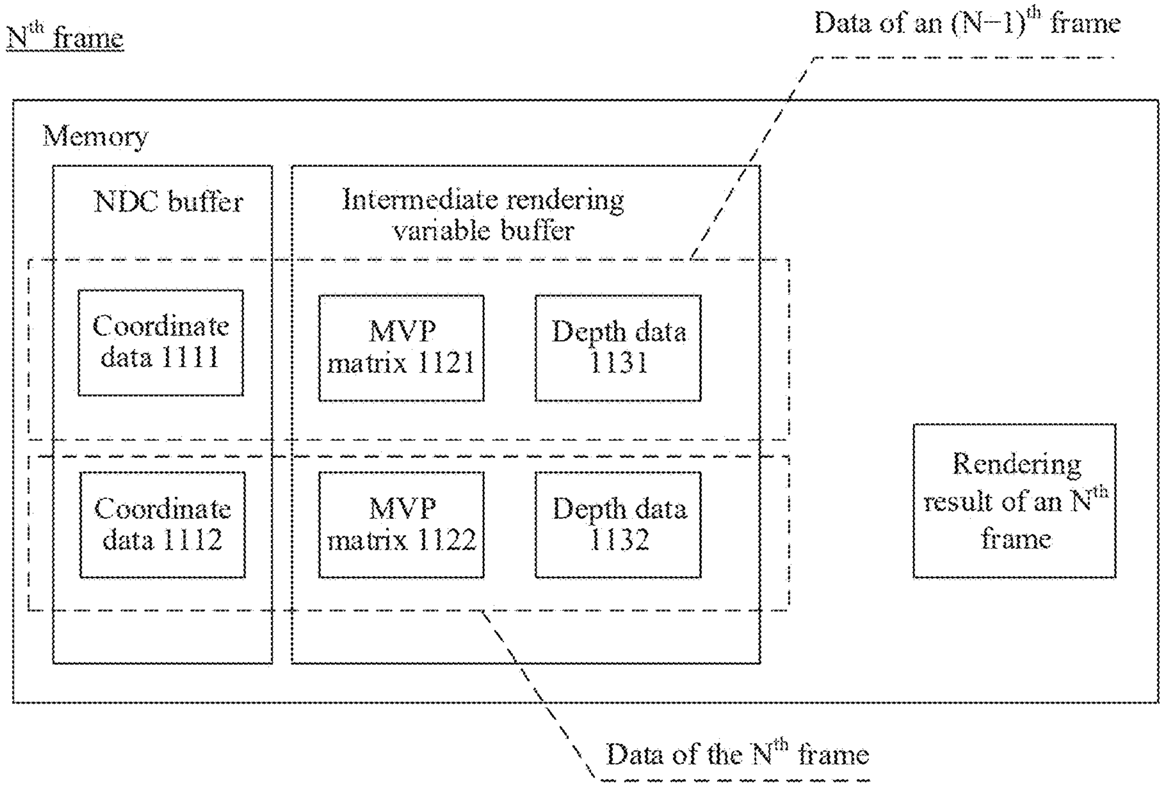
FIG. 12 is a schematic diagram of storing data by a memory according to an embodiment of this application.

Next, the electronic device may render the $N^{th}$ frame image based on an instruction of the application. In combination with the descriptions of the solutions in FIG. 5 to FIG. 10, after the $N^{th}$ frame image is rendered, as shown in FIG. 12, coordinate data 1111 of all dynamic meshes of the $(N-1)^{th}$ frame image and coordinate data 1112 of all dynamic meshes of the $N^{th}$ frame image may be backed up in the NDC buffer of the memory. An intermediate rendering variable of the $(N-1)^{th}$ frame image and an intermediate rendering variable of the $N^{th}$ frame image may be backed up in the intermediate variable buffer of the memory. The intermediate rendering variable of the $(N-1)^{th}$ frame image may include an MVP matrix 1121 and depth data 1131. The intermediate rendering variable of the $N^{th}$ frame image may include an MVP matrix 1122 and depth data 1132. In addition, a rendering result corresponding to the $N^{th}$ frame image may be further stored in the memory to cover a rendering result corresponding to the $(N-1)^{th}$ frame image.

In this application, after completing the rendering operation on the $N^{th}$ frame image, the electronic device may calculate a motion vector from the $(N-1)^{th}$ frame image to the $N^{th}$ frame image based on the data backed up in the memory shown in FIG. 12, thereby predicting an $(N+1)^{th}$ frame image based on the motion vector.

In an example, the electronic device may calculate a motion vector of a static object between two frame images and a motion vector of a dynamic object between two frame images through different solutions.

Descriptions are provided below.

Figure 13:
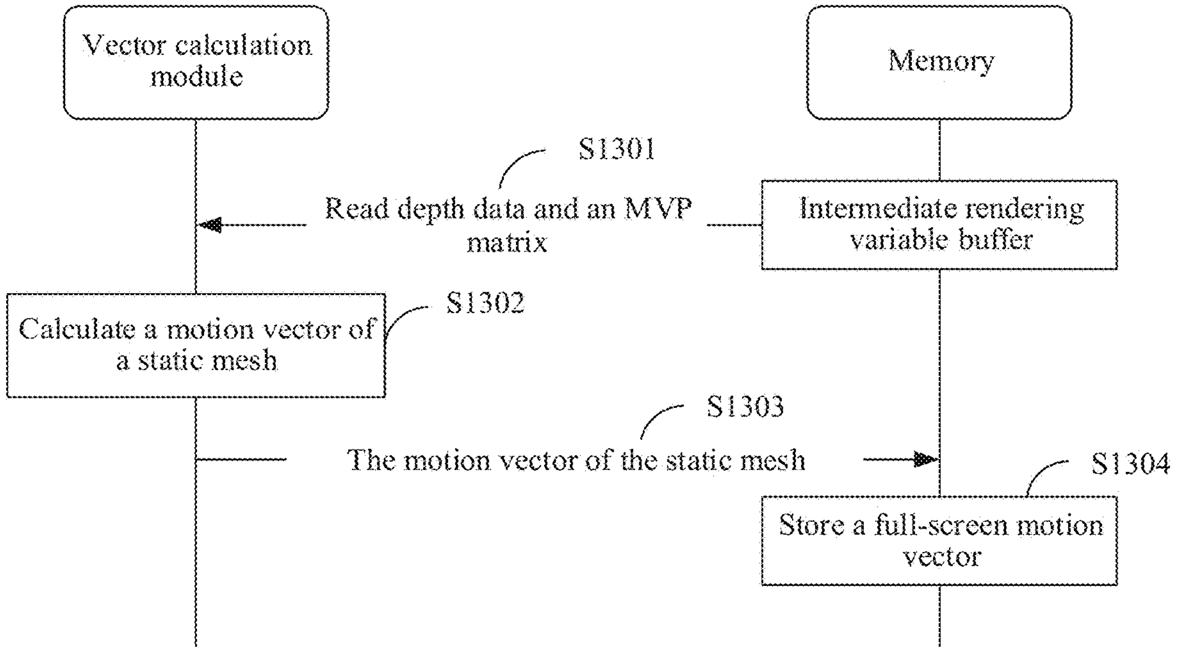
FIG. 13 is a schematic diagram of module interaction of an image processing method according to an embodiment of this application.

FIG. 13 is a schematic diagram of another image processing method according to an embodiment of this application. Through the solution, a motion vector of a static object between two frame images can be calculated. It should be understood that, the static object has a same coordinate in a world coordinate system in different frame images. Therefore, the motion vector of the static object may correspond to motion vectors of all displayed elements in a frame image other than a dynamic object. In other words, the motion vector of the static object may correspond to a full-screen motion vector. As shown in FIG. 13, the solution may include the following steps:

S1301: A vector calculation module reads depth data and an MVP matrix from an intermediate rendering variable buffer.

In this example, the vector calculation module may read depth data and MVP matrices respectively corresponding to an $(N-1)^{th}$ frame image and an $N^{th}$ frame image from the intermediate variable buffer.

In combination with an example of FIG. 12, the vector calculation module may read the MVP matrix 1121, the depth data 1131, the MVP matrix 1122, and the depth data 1132 from the intermediate rendering variable buffer.

Each frame image may correspond to an MVP matrix. Depth data of each frame image may include depth data of each pixel point in the corresponding frame image.

S1302: The vector calculation module calculates a motion vector of each pixel on a screen.

In an example, an equation (1) may be preset in the vector calculation module, which is used for calculating a motion vector of each pixel point on the screen between the $(N-1)^{th}$ frame image and the $N^{th}$ frame image based on the data read in S1301.

$$\overrightarrow{Pc} = P_c - P_p = \left(I - (VP_p)^{-1} * (VP_c)\right) * P_c. \quad \text{Equation (1)}$$

$\overrightarrow{Pc}$ is a motion vector of a pixel point. $P_c$ and $P_p$ are respectively three-dimensional coordinates of the pixel point in preceding and succeeding frame images in a camera coordinate system. $VP_p$ and $VP_c$ are respectively MVP matrices respectively corresponding to the preceding and succeeding frame images.

In the above equation (1), the three-dimensional coordinate of the pixel point in the $(N-1)^{th}$ frame image or the $N^{th}$ frame image in the camera coordinate system may be obtained through the following equation (2).

$$P_x = \langle (u*2.0+1.0)*z \,|\, (v*2.0+1.0)*z \,|\, z \rangle^T. \qquad \text{Equation (2)}$$

(u, v) is any pixel point on the screen. z is a depth of the pixel point in a current frame image. $P_x$ is a three-dimensional coordinate of the pixel point in the current frame image (for example, the $(N-1)^{th}$ frame image or the $N^{th}$ frame image) in the camera coordinate system.

Through the above equation (1) and equation (2), the motion vector of each pixel point can be calculated based on the three-dimensional coordinate of the pixel point including the depth data.

In this example, a set of the motion vectors of the pixel points on the screen may correspond to a full-screen motion vector.

S1303: The vector calculation module sends a full-screen motion vector including the motion vectors of all pixel points to a memory.

S1304: The memory stores the full-screen motion vector.

Through the solution shown in FIG. 13, the electronic device can calculate the motion vector of the static object based on the depth data of the preceding and succeeding frame images after rendering the $N^{th}$ frame image. It may be understood that, compared to an existing motion vector calculation manner based on two-dimensional information, in the solution shown in FIG. 13, the motion vector is obtained in combination with the depth data, so that a more accurate full-screen motion vector is calculated.

It should be understood that, the full-screen motion vector calculated by using the above equation (1) and equation (2) may be used for predicting a position of the static object (that is, a stationary object in a world coordinate system) in an $(N+1)^{th}$ frame image. For example, the $N^{th}$ frame image is used as a reference. The position of the static object in the $(N+1)^{th}$ frame image may be obtained by calculating a displacement along the full-screen motion vector.

Different from the static object, a dynamic object has different motion trends in different frame images. In this embodiment of this application, the electronic device may calculate a motion vector corresponding to each dynamic object for each dynamic object. In this way, prediction of a position of the dynamic object in the $(N+1)^{th}$ frame image based on the customized motion vector can be much more accurate.

A solution for calculating a motion vector of a dynamic object in embodiments of this application is described below with reference to FIG. 14 to FIG. 18 by using examples. Through the solution provided in embodiments of this application, a motion vector corresponding to each dynamic object can be calculated for each dynamic object. The solution may be implemented through two steps: mesh matching and motion vector calculation. Descriptions are provided below.

Figure 14:
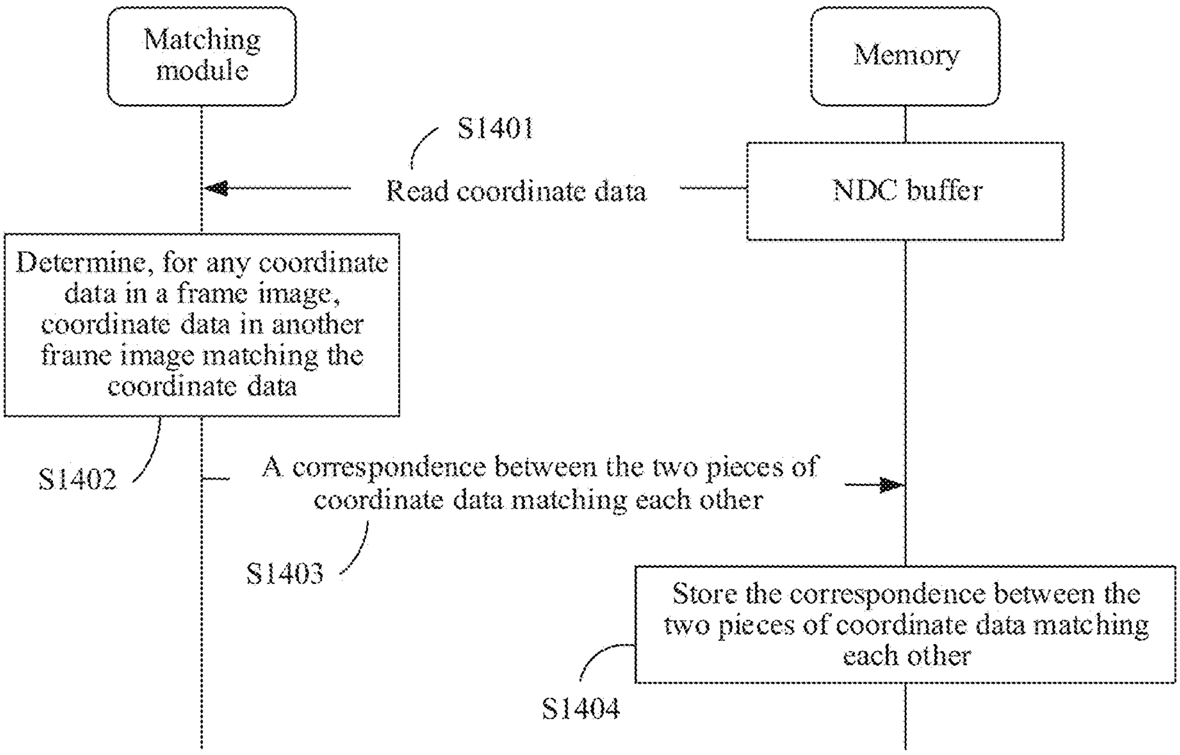
FIG. 14 is a schematic diagram of module interaction of an image processing method according to an embodiment of this application.

In an implementation of the solution, positions of a same dynamic object (a dynamic mesh) in different frame images may be determined through the mesh matching. As shown in FIG. 14, the solution may include the following steps:

S1401: A matching module reads coordinate data from a memory.

In an example, the matching module may read coordinate data of an $(N-1)^{th}$ frame image and an $N^{th}$ frame image from an NDC buffer of the memory.

In an implementation, in combination with the descriptions in FIG. 12 and FIG. 8, the matching module may read the coordinate data corresponding to each dynamic mesh in the $(N-1)^{th}$ frame image from the first NDC buffer. For example, the matching module may read the coordinate data A to the coordinate data An from the first NDC buffer. The matching module may further read the coordinate data corresponding to each dynamic mesh in the $N^{th}$ frame image from the second NDC buffer. For example, the matching module may read the coordinate data B to the coordinate data Bm from the second NDC buffer.

S1402: Determine, for any coordinate data in a frame image, coordinate data in another frame image matching the coordinate data.

In combination with the above relevant description in FIG. 6, one piece of coordinate data may correspond to one Drawcall, that is, correspond to one model. The coordinate data may include a specific coordinate of each vertex of the model in a frame image (for example, the $(N-1)^{th}$ frame image or the $N^{th}$ frame image) in an NDC space. The coordinate data may further include a drawing parameter corresponding to the model.

In some embodiments, the matching module may determine two pieces of coordinate data in two frame images matching each other based on drawing parameters included in different coordinate data.

In an example, the matching module may convert any drawing parameter into a corresponding hash value. Different drawing parameters correspond to different hash values.

Figure 15:
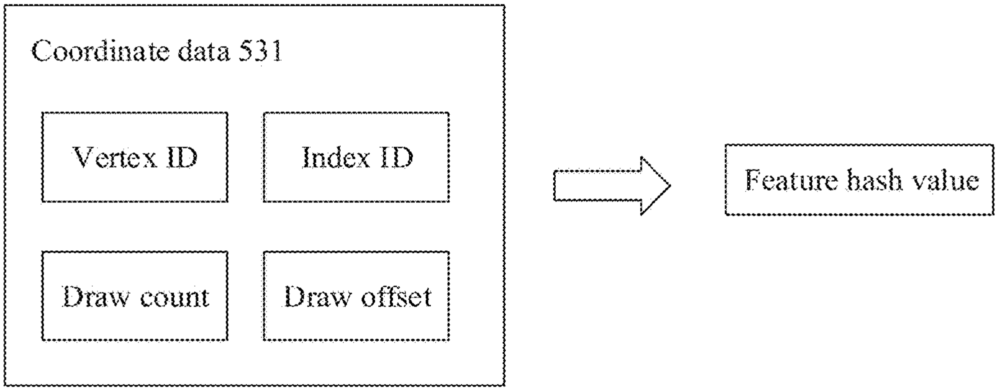
FIG. 15 is a schematic diagram of a correspondence between coordinate data and a hash value according to an embodiment of this application.

For example, referring to FIG. 15, an example in which the drawing parameter include a vertex identifier (Vertex ID), an index identifier (Index ID), a draw count, and a draw offset is used. For the coordinate data 531, the matching module may determine a feature hash value corresponding to the coordinate data 531 based on a vertex ID, an index ID, a draw count, and a draw offset included in the coordinate data. Similarly, for each piece of other coordinate data, the matching module may determine a corresponding feature hash value based on a drawing parameter of the coordinate data.

In this way, the coordinate data in the $(N-1)^{th}$ frame image and the coordinate data in the $N^{th}$ frame image each may correspond to a feature hash value.

Figure 16:
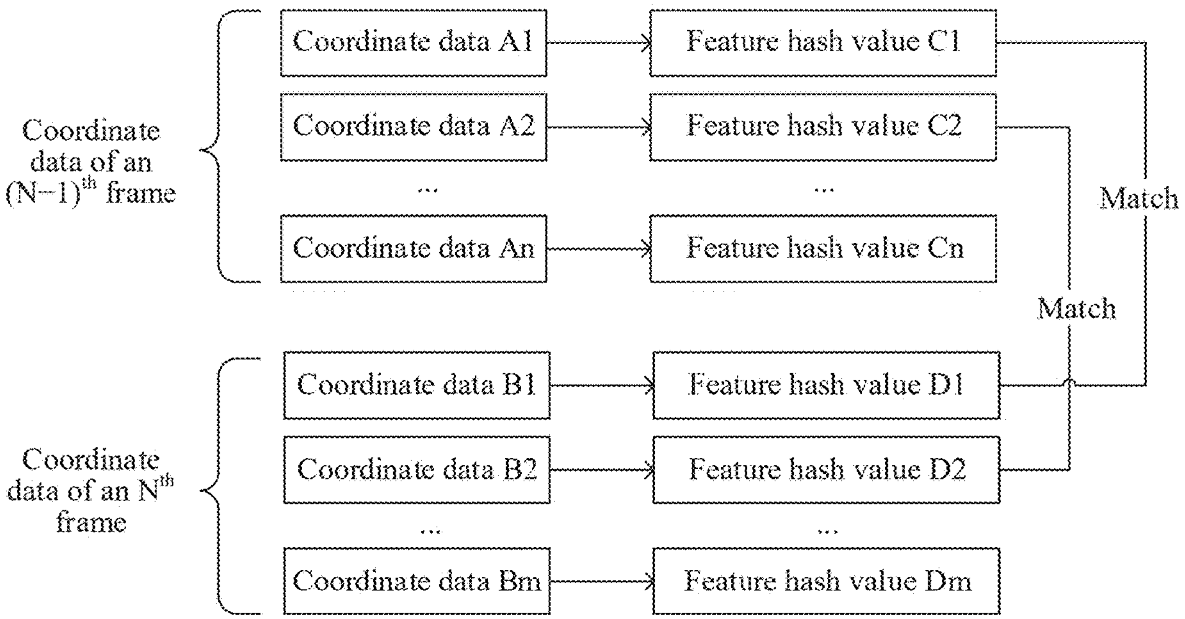
FIG. 16 is a schematic diagram of coordinate data matching according to an embodiment of this application.

For example, referring to FIG. 16, for the $(N-1)^{th}$ frame image, the coordinate data A1 may correspond to a feature hash value C1, the coordinate data A2 may correspond to a feature hash value C2, . . . , and the coordinate data An may correspond to a feature hash value Cn. Similarly, for the $N^{th}$ frame image, the coordinate data B1 may correspond to a feature hash value D1, the coordinate data B2 may correspond to a feature hash value D2, . . . , and the coordinate data Bm may correspond to a feature hash value Dm.

The matching module may achieve matching between the coordinate data in the different frame images based on the feature hash value corresponding to each coordinate data.

In an example, the matching module may search the feature hash value D1 to the feature hash value Dm for an item matching the feature hash value C1 based on the feature hash value C1. The matching module may use coordinate data corresponding to the feature hash value matching the feature hash value C1 as coordinate data in the $N^{th}$ frame image matching the coordinate data A1 in the $(N-1)^{th}$ frame image. The matching between feature hash values may include the following: When two feature hash values are the same, it is considered that the two feature hash values match each other.

For example, the feature hash value D1 matches the feature hash value C1. The matching module may determine that the coordinate data A1 in the $(N-1)^{th}$ frame image matches the coordinate data B1 in the $N^{th}$ frame image. To be specific, a model corresponding to the coordinate data A1 moves from a position indicated by the coordinate data A1 to a position indicated by the coordinate data B1 from the $(N-1)^{th}$ frame image to the $N^{th}$ frame image.

An example in which the feature hash value D2 matches the feature hash value C2 is used. The matching module may determine that the coordinate data A2 in the $(N-1)^{th}$ frame image matches the coordinate data B2 in the $N^{th}$ frame image. To be specific, a model corresponding to the coordinate data A2 moves from a position indicated by the coordinate data A2 to a position indicated by the coordinate data B2 from the $(N-1)^{th}$ frame image to the $N^{th}$ frame image.

In other embodiments, after the two pieces of coordinate data in the $(N-1)^{th}$ frame image and the $N^{th}$ frame image matching each other are preliminarily determined based on the solution shown in FIG. 16, the matching module may verify a matching relationship between the two pieces of coordinate data based on a first vertex coordinate included in each of the two pieces of coordinate data.

Figure 17:
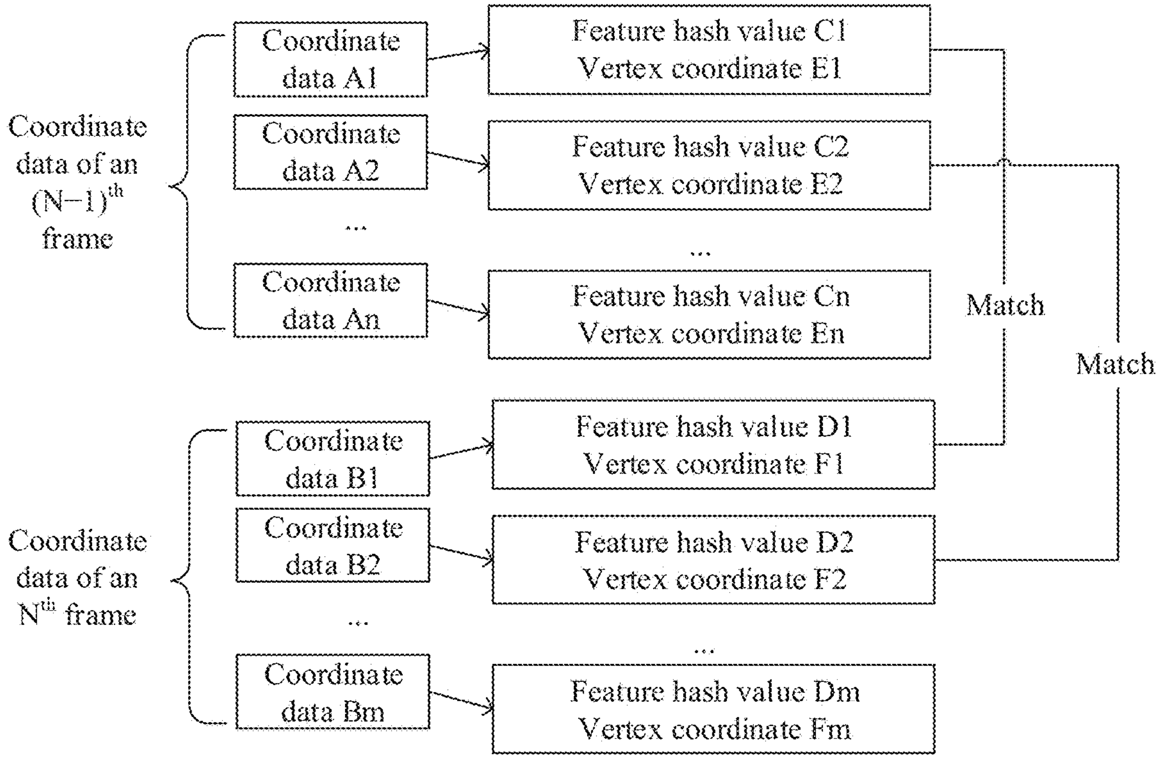
FIG. 17 is a schematic diagram of coordinate data matching according to an embodiment of this application.

In an example, with reference to FIG. 17, the matching module may determine a feature hash value corresponding to each coordinate data, and may further extract a coordinate value of a first vertex coordinate in each coordinate data as a matching factor to perform a matching operation. For example, in the $(N-1)^{th}$ frame image, a coordinate value of a first vertex coordinate of the coordinate data A1 may be a vertex coordinate E1, a coordinate value of a first vertex coordinate of the coordinate data A2 may be a vertex coordinate E2, . . . , and a coordinate value of a first vertex coordinate of the coordinate data An may be a vertex coordinate En. Correspondingly, in the $N^{th}$ frame image, a coordinate value of a first vertex coordinate of the coordinate data B1 may be a vertex coordinate F1, a coordinate value of a first vertex coordinate of the coordinate data B2 may be a vertex coordinate F2, . . . , and a coordinate value of a first vertex coordinate of the coordinate data Bm may be a vertex coordinate Fm.

In this case, the matching module may search, for each of the coordinate data A1 to the coordinate data An, the feature hash values and the vertex coordinates corresponding to the coordinate data B1 to the coordinate data Bm for an item matching the coordinate data, and use the item as coordinate data in the $N^{th}$ frame image corresponding to the coordinate data. The matching between feature hash values may include that two feature hash values are the same. The matching between vertex coordinates may include that a Euclidean distance between two vertex coordinates is less than a preset distance.

For example, the feature hash value C1 is the same as the feature hash value D1, and a Euclidean distance between the vertex coordinate E1 and the vertex coordinate F1 is less than the preset distance. In this case, the coordinate data A1 matches the coordinate data B1. For another example, the feature hash value C2 is the same as the feature hash value D2, and a Euclidean distance between the vertex coordinate E2 and the vertex coordinate F2 is less than the preset distance. In this case, the coordinate data A2 matches the coordinate data B2.

In some other embodiments, the matching module may further determine two pieces of coordinate data matching each other based on Euclidean distances between a plurality of vertex coordinates or in combination with feature hash values.

The matching module may obtain a correspondence between the coordinate data corresponding to each dynamic mesh in the $(N-1)^{th}$ frame image and the coordinate data in the $N^{th}$ frame image matching the coordinate data.

S1403: The matching module sends a correspondence between two pieces of coordinate data matching each other to the memory.

S1404: The memory stores the correspondence between the two pieces of coordinate data matching each other.

In an example, the correspondence between the coordinate data may be stored in different manners in different implementations.

In some embodiments, the memory may store corresponding table entries. Each table entry may be used for storing the two pieces of coordinate data matching each other or storing storage addresses of the two pieces coordinate data matching each other.

In some other embodiments, after obtaining the correspondence sent by the matching module, the memory may arrange an identifier in a storage region of the NDC buffer in which the two pieces of coordinate data are stored, so that the first NDC buffer and the second NDC buffer may be subsequently searched for the same identifier, to determine the two pieces of coordinate data matching each other.

In this way, the electronic device can complete the process of mesh matching. Next, a vector calculation module of the electronic device may calculate a motion vector corresponding to each dynamic mesh based on a mesh matching result. The motion vector of each dynamic mesh may be used for identifying a motion status of each dynamic object from the $(N-1)^{th}$ frame image to the $N^{th}$ frame image.

Figure 18:
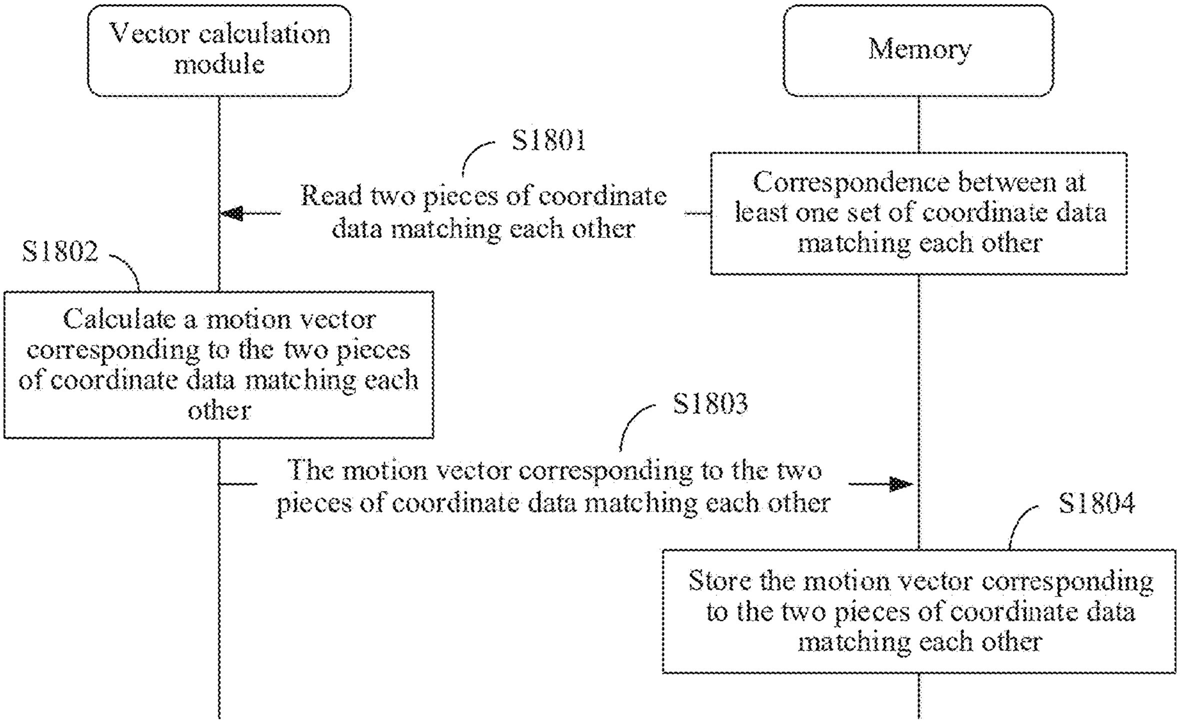
FIG. 18 is a schematic diagram of module interaction of an image processing method according to an embodiment of this application.

As an example, FIG. 18 is a schematic diagram of another image processing method according to an embodiment of this application. The solution may be used for calculating a motion vector corresponding to each dynamic mesh based on a mesh matching result after the mesh matching shown in FIG. 14 is completed. As shown in FIG. 18, the solution may include the following steps:

S1801: A vector calculation module reads two pieces of coordinate data matching each other.

In combination with the description of the solution shown in FIG. 14, after the mesh matching is completed, the memory may store a correspondence of at least one set of coordinate data matching each other. Each set of coordinate data may correspond to positions of a dynamic mesh (a model) in two frame images.

Therefore, in this example, the vector calculation module may read any one set of the at least one set of coordinate data, and calculate a motion vector of a dynamic mesh corresponding to the set of coordinate data based on subsequent steps.

S1802: The vector calculation module calculates a motion vector corresponding to the two pieces of coordinate data matching each other.

In this example, the vector calculation module may calculate the motion vector corresponding to the two pieces of coordinate data based on a preset equation (3).

$$\overrightarrow{Pc} = \{V_c\} - \{V_p\}. \quad \text{Equation (3)}$$

$\vec{Pc}$ is a motion vector. $\{V_c\}$ and $\{V_P\}$ are two pieces of coordinate data in preceding and succeeding frame images matching each other. It may be understood that, the two pieces of coordinate data matching each other may respectively correspond to a plurality of vertex coordinates of a dynamic object (a model). Therefore, $\{V_c\}$ and $\{V_P\}$ each may include a vertex coordinate set composed of a plurality of vertex coordinates of a same dynamic object in preceding and succeeding frame images.

In some embodiments of this application, after $\vec{Pc}$ is calculated through the equation (3), rasterization may be further performed on $\vec{Pc}$, to obtain a motion vector of the dynamic object corresponding to the two pieces of coordinate data from the $(N-1)^{th}$ frame image to the $N^{th}$ frame image.

It should be noted that, in some other embodiments of this application, the vector calculation module may further enable a depth test when calculating the motion vector of the dynamic object.

In this example, the electronic device may enable the depth test, compare a source depth value with a target depth value, and determine whether the depth test succeeds based on a preset rule. The source depth value and the target depth value may respectively identify two different depth values in a same frame image with same coordinate information. It may be understood that, during image rendering, an object is compressed from a three-dimensional form into a two-dimensional form. Therefore, some three-dimensional spatial points overlapping each other inevitably exist on a two-dimensional image. In this case, positions of points that need to be displayed may be determined through the depth test.

Therefore, when calculating the motion vector corresponding to the dynamic object, the vector calculation module may selectively calculate a motion vector of a point that passes the depth test. For a point that does not pass the depth test, the motion vector calculation may be omitted. In this way, motion vector calculation overheads are reduced.

S1803: The vector calculation module sends the motion vector corresponding to the two pieces of coordinate data matching each other to the memory.

S1804: The memory stores the motion vector corresponding to the two pieces of coordinate data matching each other.

After obtaining the motion vector corresponding to the two pieces of coordinate data matching each other, the vector calculation module may store the motion vector in the memory.

The above steps S1801 to S1804 may be performed for each set of coordinate data in the $(N-1)^{th}$ frame image and the $N^{th}$ frame image matching each other, to obtain motion vectors respectively corresponding to all dynamic objects.

in some cases, when a plurality of sets of coordinate data match each other exist, that is, when a plurality of dynamic objects for which motion vectors need to be calculated exist in an image, to enable a calculated motion vector to correspond to a dynamic object, each time the electronic device obtains and stores a motion vector, the electronic device may store a correspondence between the motion vector and corresponding coordinate data (or a dynamic object) for accurate calling during subsequent use.

Based on the above implementations of the solutions in FIG. 5 to FIG. 18, the calculation of the motion vectors of the static object and the dynamic object can be completed separately. Based on the above, the electronic device can predict the $(N+1)^{th}$ frame image.

In an example, the electronic device may predict the $(N+1)^{th}$ frame image based on the motion vectors of the static object and the dynamic object.

In a possible implementation, the electronic device may use the $N^{th}$ frame image as a reference to perform vector movement on the static object in the $N^{th}$ frame image based on the above calculated motion vector of the static object, thereby predicting a position of the static object in the $(N+1)^{th}$ frame image.

In another implementation, the electronic device may use the $N^{th}$ frame image as the reference to perform vector movement on any dynamic object in the $N^{th}$ frame image based on the above calculated motion vector corresponding to the dynamic object, thereby predicting a position of the dynamic object in the $(N+1)^{th}$ frame image. Correspondingly, for another dynamic object, the electronic device may perform similar prediction, to obtain a position of the another dynamic object in the $(N+1)^{th}$ frame image.

Figure 19:
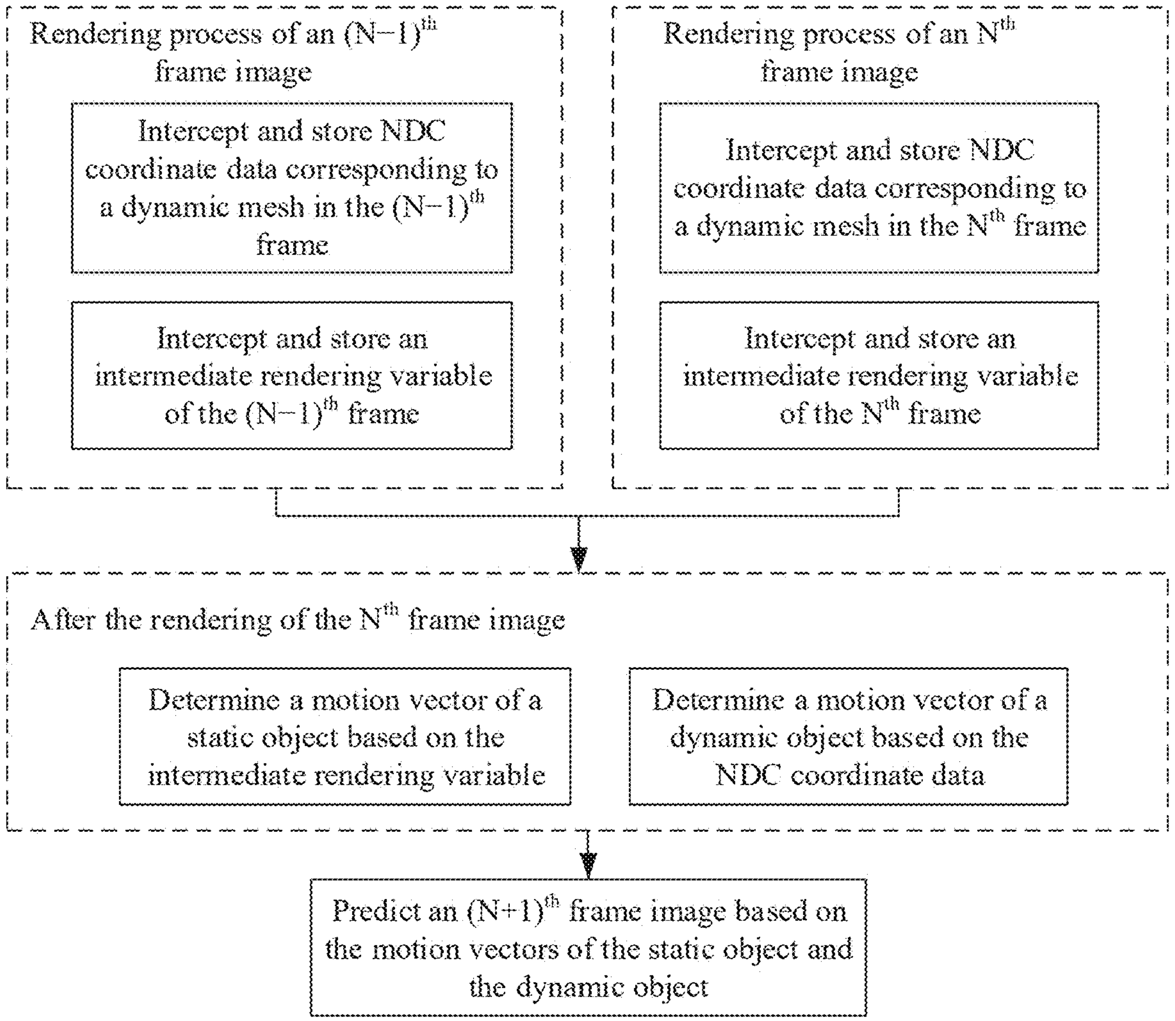
FIG. 19 is a schematic flowchart of an image processing method according to an embodiment of this application.

To enable a person skilled in the art to understand the overall solution provided in this application more clearly, FIG. 19 is a schematic logic diagram of an image processing method during implementation according to an embodiment of this application.

As shown in FIG. 19, an example in which a current frame image is an $N^{th}$ frame image is used.

During rendering of an $(N-1)^{th}$ frame image, an electronic device may intercept and store NDC coordinate data corresponding to a dynamic mesh in the $(N-1)^{th}$ frame. The electronic device may further intercept and store an intermediate rendering variable of the $(N-1)^{th}$ frame. The intermediate rendering variable may include an MVP matrix, depth data, and the like of the $(N-1)^{th}$ frame image.

Similarly, during rendering of the $N^{th}$ frame image, the electronic device may intercept and store NDC coordinate data corresponding to a dynamic mesh in the $N^{th}$ frame. The electronic device may further intercept and store an intermediate rendering variable of the $N^{th}$ frame. The intermediate rendering variable may include an MVP matrix, depth data, and the like of the $N^{th}$ frame image.

In this case, after rendering the $N^{th}$ frame image, the electronic device may calculate a motion vector based on the above data that is backed up. In an example, the electronic device may determine a motion vector of a static object based on the intermediate rendering variable. The electronic device may determine a motion vector of a dynamic object based on the NDC coordinate data. Therefore, a motion vector of a static object from the $(N-1)^{th}$ frame image to the $N^{th}$ frame image and a motion vector corresponding to each dynamic object can be obtained.

Based on the above, the electronic device can predict an $(N+1)^{th}$ frame image based on the motion vectors of the static object and the dynamic object.

In the solutions provided in embodiments of this application, the motion vector of the static object is calculated in combination with the depth data, which is more accurate than a motion vector calculated based on a two-dimensional coordinate. Through separate calculation for the dynamic object and the static object, the motion vectors respectively corresponding to the dynamic objects are calculated, to obtain more accurate motion vectors of the dynamic objects. Based on the above more accurate motion vectors of the static object and the dynamic objects, prediction of a future frame image can be performed accurately.

In addition, during calculation of the motion vectors of the dynamic objects, hash matching is performed based on the drawing parameter, which can significantly reduce a required computing power and power consumption compared to a brightness or color-based matching manner.

The above mainly describes the solutions provided in embodiments of this application from a perspective of each service module. To implement the above functions, the electronic device includes a corresponding hardware structure and/or software module configured to perform each function. A person skilled in the art should be easily aware that, units, algorithms, and steps in the examples described with reference to embodiments disclosed in this specification may be implemented in a form of hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application. It should be noted that, in embodiments of this application, the module division is an example, and is merely logical function division, and additional division manners may exist during actual implementation.

Figure 20:
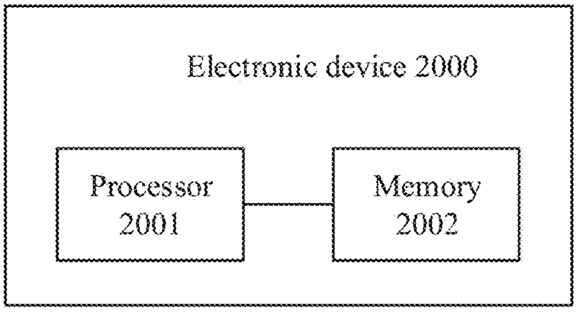
FIG. 20 is a schematic diagram of composition of an electronic device according to an embodiment of this application.

FIG. 20 is a schematic diagram of composition of an electronic device 2000. As shown in FIG. 20, the electronic device 2000 may include a processor 2001 and a memory 2002. The memory 2002 is configured to store computer-executable instructions. In an example, in some embodiments, the processor 2001 may cause the electronic device 2000 to perform any one of the image processing methods shown in the above embodiments of this application when executing the instructions stored in the memory 2002.

It should be noted that, all relevant content of the steps involved in the above method embodiments may be cited as functional description of the corresponding function modules. Details are not described herein.

Figure 21:
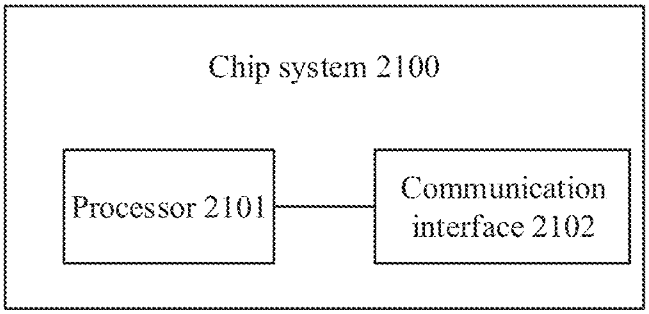
FIG. 21 is a schematic diagram of composition of a chip system according to an embodiment of this application.

FIG. 21 is a schematic diagram of composition of a chip system 2100. The chip system 2100 may include a processor 2101 and a communication interface 2102, and is configured to support a relevant device to implement the functions involved in the above embodiments. In a possible design, the chip system further includes a memory, and is configured to store a program instruction and data necessary to a terminal. The chip system may be composed of a chip, or may include a chip and another discrete device. It should be noted that, in some implementations of this application, the communication interface 2102 may also be referred to as an interface circuit.

It should be noted that, all relevant content of the steps involved in the above method embodiments may be cited as functional description of the corresponding function modules. Details are not described herein.

All or some of the functions or actions or operations or steps in the above embodiments may be implemented by software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, all or some of the processes or functions according to embodiments of this application are generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, a computer, a server, or a data center to another website, computer, server, or data center in a wired manner (for example, through a coaxial cable, an optical fiber, or a digital subscriber line (DSL)) or a wireless manner (for example, in an infrared, radio, or microwave manner). The computer-readable storage medium may be any usable medium accessible to a computer, or may be a data storage device such as a server or a data center in which one or more usable media are integrated. The usable medium may be a magnetic medium (for example, a soft disk, a hard disk, or a magnetic tape), an optical medium (for example, a DVD), a semiconductor medium (for example, a solid state disk (SSD)), or the like.

Although this application is described with reference to the specific features and embodiments thereof, apparently, various modifications and combinations may be made to this application without departing from the spirit and scope of this application. Correspondingly, the specification and the drawings are merely example descriptions of this application defined by the following claims, and are deemed to have covered any and all modifications, variations, combinations, or equivalents that fall within the scope of this application. Apparently, a person skilled in the art may make various modifications and variations to this application without departing from the spirit and scope of this application. In this case, if the modifications and the variations made to this application fall within the scope of the claims of this application and equivalent technologies thereof, this application is intended to include these modifications and variations.

The invention claimed is:

1. An image processing method, applicable to an electronic device, the method comprising:

obtaining, by the electronic device, at least two frame images through image rendering, wherein any one of the at least two frame images comprises a dynamic mesh and a static mesh, and in different frame images, a model corresponding to the dynamic mesh has different coordinates under a world coordinate system, and a model corresponding to the static mesh has a same coordinate under the world coordinate system;

determining a position of a static mesh of a next frame image based on intermediate rendering variables of the at least two frame images, wherein each intermediate rendering variable comprises a model-view-projection (MVP) matrix and depth data of a corresponding frame image;

determining, based on coordinate data of a first model in the at least two frame images, a position of the first model in the next frame image, wherein a mesh corresponding to the first model is the dynamic mesh, the coordinate data comprises a normalized device coordinate (NDC) coordinate and a drawing parameter of the first model in the corresponding frame image, wherein the NDC coordinate comprises at least one vertex coordinate, and wherein the drawing parameter is used for instructing the electronic device to draw the first model; and determining the next frame image based on the position of the static mesh of the next frame image and the position of the first model in the next frame image.

2. The method according to claim 1, wherein the image comprises models corresponding to a plurality of dynamic meshes; and wherein the determining, based on the coordinate data of the first model in the at least two frame images, the position of the first model in the next frame image comprises:

determining coordinate data of the first model in different frame images based on the coordinate data of the first model in the at least two frame images and feature hash value matching, wherein the first model has a same feature hash value in different frame images, and different models have different feature hash values in a same frame image; and determining the position of the first model in the next frame image based on the coordinate data of the first model in the different frame images.

3. The method according to claim 1, wherein the at least two frame images comprise an $N^{th}$ frame image and an $(N-1)^{th}$ frame image, and the next frame image is an $(N+1)^{th}$ frame image; and wherein the determining, based on the coordinate data of the first model in the at least two frame images, the position of the first model in the next frame image comprises:

determining a motion vector of the first model based on first coordinate data of the first model in the $(N-1)^{th}$ frame image and second coordinate data of the first model in the $N^{th}$ frame image; and determining the position of the first model in the $(N+1)^{th}$ frame image based on a position of the static mesh in the $N^{th}$ frame image and the motion vector of the first model.

4. The method according to claim 3, wherein the electronic device is configured with an NDC buffer, and before the determining the motion vector of the first model based on the coordinate data of the first model, the method further comprises:

obtaining the first coordinate data and the second coordinate data, and storing the first coordinate data and the second coordinate data in the NDC buffer;

wherein the determining the motion vector of the first model based on the coordinate data of the first model comprises:

reading the first coordinate data and the second coordinate data of the first model from the NDC buffer, and determining the motion vector of the first model based on the first coordinate data and the second coordinate data.

5. The method according to claim 4, wherein the obtaining the first coordinate data of the first model comprises:

enabling a transform feedback function before drawing of the first model in the $(N-1)^{th}$ frame image, wherein a graphics processing unit (GPU) of the electronic device feeds back the first coordinate data to the electronic device based on the transform feedback function during the drawing of the first model, and the first coordinate data comprises first NDC coordinate data of the first model in the $(N-1)^{th}$ frame image and a first drawing parameter corresponding to the first model in the $(N-1)^{th}$ frame image; and obtaining, by the electronic device, the first coordinate data from the GPU, and storing the first coordinate data in a first NDC buffer of the NDC buffer.

6. The method according to claim 5, further comprising: disabling the transform feedback function.

7. The method according to claim 4, wherein the obtaining the second coordinate data of the first model comprises:

enabling the transform feedback function before drawing of the first model in the $N^{th}$ frame image, wherein a graphics processing unit (GPU) of the electronic device feeds back the second coordinate data to the electronic device based on the transform feedback function during the drawing of the first model, and the second coordinate data comprises second NDC coordinate data of the first model in the $N^{th}$ frame image and a second drawing parameter corresponding to the first model in the $N^{th}$ frame image; and obtaining, by the electronic device, the second coordinate data in a second NDC buffer of the NDC buffer.

8. The method according to claim 4, wherein before the obtaining the first coordinate data and the second coordinate data of the first model, the method further comprises:

determining that the mesh of the first model is the dynamic mesh.

9. The method according to claim 8, wherein the determining that the mesh of the first model is the dynamic mesh comprises:

determining that the mesh of the first model is the dynamic mesh based on coordinate data of the first model in a current frame image being updated.

10. The method according to claim 4, wherein the image comprises at least two models whose meshes are dynamic meshes, the at least two models whose meshes are dynamic meshes comprise the first model, the NDC buffer stores coordinate data of each model corresponding to different frame images, and the method further comprises:

determining two pieces of coordinate data corresponding to the first model in the different frame images in the NDC buffer.

11. The method according to claim 10, wherein the determining the two pieces of coordinate data corresponding to the first model in the different frame images in the NDC buffer comprises:

determining, based on a drawing parameter comprised in each coordinate data stored in the NDC buffer, feature hash values corresponding to each coordinate data; and determining coordinate data in the NDC buffer that has a feature hash value the same as a feature hash value corresponding to the first coordinate data as the second coordinate data.

12. The method according to claim 10, wherein the determining the two pieces of coordinate data corresponding to the first model in the different frame images in the NDC buffer comprises:

determining, based on a drawing parameter comprised in each coordinate data stored in the NDC buffer, feature hash values corresponding to each coordinate data; and determining, as the second coordinate data, coordinate data in the NDC buffer which has a feature hash value the same as the feature hash value corresponding to the first coordinate data and which has a first vertex coordinate having a distance from a first vertex coordinate of the first coordinate data that is less than a preset distance.

13. The method according to claim 1, wherein the drawing parameter comprises at least one of:

a vertex identifier, an index identifier, a draw count, or a draw offset.

14. The method according to claim 1, wherein the at least two frame images comprise an $N^{th}$ frame image and an $(N-1)^{th}$ frame image, and the next frame image is an $(N+1)^{th}$ frame image; and wherein the determining the position of the static mesh of the next frame image based on the intermediate rendering variables of the at least two frame images comprises:

determining a motion vector of a static mesh of the $N^{th}$ frame image based on a first MVP matrix and first depth data of the $(N-1)^{th}$ frame image and a second MVP matrix and second depth data of the $N^{th}$ frame image; and determining a position of the static mesh in the $(N+1)^{th}$ frame image based on a position of the static mesh in the $N^{th}$ frame image and the motion vector of the static mesh.

15. The method according to claim 14, wherein a memory of the electronic device is configured with an intermediate rendering variable buffer;

wherein before the determining the motion vector of the static mesh of the $N^{th}$ frame image based on the intermediate rendering variables of the at least two frame images, the method further comprises:

obtaining the first MVP matrix, the first depth data, the second MVP matrix, and the second depth data, and storing the obtained data in the intermediate rendering variable buffer; and wherein the determining the motion vector of the static mesh of the $N^{th}$ frame image based on the intermediate rendering variables of the at least two frame images comprises:

reading the first MVP matrix, the first depth data, the second MVP matrix, and the second depth data from the intermediate rendering variable buffer, and determining the motion vector of the static mesh of the $N^{th}$ frame image.

16. The method according to claim 15, wherein the obtaining and storing the first MVP matrix comprises:

intercepting, by the electronic device, a first instruction segment in a first instruction stream used for transmitting the first MVP matrix, and storing the first MVP matrix in a first intermediate rendering variable buffer of the intermediate rendering variable buffer based on the first instruction segment, wherein the first instruction stream is used for instructing the electronic device to render the $(N-1)^{th}$ frame image.

17. The method according to claim 16, wherein the intercepting, by the electronic device, the first instruction segment comprises:

intercepting, by the electronic device, the first instruction segment in the first instruction stream carrying a uniform parameter.

18. The method according to claim 15, wherein the obtaining and storing the first depth data comprises:

intercepting, by the electronic device, a second instruction segment in the first instruction stream related to the first depth data, and storing the first depth data in a second intermediate rendering variable buffer of the intermediate rendering variable buffer based on the second instruction segment, wherein the first instruction stream is used for instructing the electronic device to render the $(N-1)^{th}$ frame image.

19. An electronic device, comprising:

one or more processors; and one or more memories, wherein the one or more memories are coupled to the one or more processors, and the one or more memories store computer instructions;

wherein the one or more processors, when executing the computer instructions, cause the electronic device to perform operations comprising:

obtaining, by the electronic device, at least two frame images through image rendering. wherein any one of the at least two frame images comprises a dynamic mesh and a static mesh, and in different frame images, a model corresponding to the dynamic mesh has different coordinates under a world coordinate system, and a model corresponding to the static mesh has a same coordinate under the world coordinate system;

determining a position of a static mesh of a next frame image based on intermediate rendering variables of the at least two frame images, wherein each intermediate rendering variable comprises a model-view-projection (MVP) matrix and depth data of a corresponding frame image;

determining, based on coordinate data of a first model in the at least two frame images, a position of the first model in the next frame image, wherein a mesh corresponding to the first model is the dynamic mesh, the coordinate data comprises a normalized device coordinate (NDC) coordinate and a drawing parameter of the first model in the corresponding frame image, wherein the NDC coordinate comprises at least one vertex coordinate, and wherein the drawing parameter is used for instructing the electronic device to draw the first model; and determining the next frame image based on the position of the static mesh of the next frame image and the position of the first model in the next frame image.

20. A non-transitory computer-readable storage medium storing computer instructions, wherein the computer instructions, when executed by a processor, cause an electronic device to perform operations comprising:

obtaining, by the electronic device, at least two frame images through image rendering, wherein any one of the at least two frame images comprises a dynamic mesh and a static mesh, and in different frame images, a model corresponding to the dynamic mesh has different coordinates under a world coordinate system, and a model corresponding to the static mesh has a same coordinate under the world coordinate system;

determining a position of a static mesh of a next frame image based on intermediate rendering variables of the at least two frame images, wherein each intermediate rendering variable comprises a model-view-projection (MVP) matrix and depth data of a corresponding frame image;

determining, based on coordinate data of a first model in the at least two frame images, a position of the first model in the next frame image, wherein a mesh corresponding to the first model is the dynamic mesh, the coordinate data comprises a normalized device coordinate (NDC) coordinate and a drawing parameter of the first model in the corresponding frame image, wherein the NDC coordinate comprises at least one vertex coordinate, and wherein the drawing parameter is used for instructing the electronic device to draw the first model; and determining the next frame image based on the position of the static mesh of the next frame image and the position of the first model in the next frame image.

* * * * *